US012025702B2

(12) United States Patent
Droz et al.

(10) Patent No.: US 12,025,702 B2
(45) Date of Patent: Jul. 2, 2024

(54) RETROREFLECTOR DETECTION AND AVOIDANCE IN A LIDAR DEVICE

(71) Applicant: Waymo LLC, Mountain View, CA (US)

(72) Inventors: Pierre-Yves Droz, Los Altos, CA (US); Michael Marx, Mountain View, CA (US); Ethan Stark, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 857 days.

(21) Appl. No.: 17/028,847

(22) Filed: Sep. 22, 2020

(65) Prior Publication Data

US 2021/0165094 A1 Jun. 3, 2021

Related U.S. Application Data

(60) Provisional application No. 62/941,989, filed on Nov. 29, 2019.

(51) Int. Cl.
*G01S 17/10* (2020.01)
*G01S 7/481* (2006.01)
(Continued)

(52) U.S. Cl.
CPC ............ *G01S 17/10* (2013.01); *G01S 7/4815* (2013.01); *G01S 7/4817* (2013.01); *G01S 7/484* (2013.01); *G01S 17/89* (2013.01); *G01S 17/931* (2020.01)

(58) Field of Classification Search
None
See application file for complete search history.

(56) References Cited

U.S. PATENT DOCUMENTS 8,767,190 B2 7/2014 Hall
8,842,015 B2 9/2014 Scott
(Continued)

FOREIGN PATENT DOCUMENTS

CA 3094023 A1 10/2019
JP S60-7317 A 1/1985
(Continued)

OTHER PUBLICATIONS

International Search Report and Written Opinion of International Application No. PCT/US2020/061448, dated Mar. 16, 2021.

*Primary Examiner* — Luke D Ratcliffe
(74) *Attorney, Agent, or Firm* — McDonnell Boehnen Hulbert & Berghoff LLP

(57) ABSTRACT

A light detection and ranging (LIDAR) device includes a light emitter configured to emit light pulses into a field of view and a detector configured to detect light in the field of view. The light emitter emits a first light pulse. The detector detects, during a first measurement period, at least one reflected light pulse that is indicative of reflection by a retroreflector based on a shape of a reflected light pulse, a magnitude of a reflected light pulse, and/or a time separation between two reflected light pulses. In response to detecting the at least one reflected light pulse indicative of reflection by a retroreflector, the light emitter is deactivated for one or more subsequent measurement periods. Additionally, the LIDAR device may inform one or more other LIDAR devices by transmitting to a computing device information indicative of the retroreflector being within the field of view of the light emitter.

20 Claims, 24 Drawing Sheets

(51) Int. Cl.
  *G01S 7/484* (2006.01)
  *G01S 17/89* (2020.01)
  *G01S 17/931* (2020.01)

(56) References Cited

U.S. PATENT DOCUMENTS

| | | |
|---|---|---|
| 10,036,801 B2 | 7/2018 | Retterath et al. |
| 10,203,399 B2 | 2/2019 | Retterath et al. |
| 10,317,532 B1 | 6/2019 | Jannson et al. |
| 2015/0346325 A1 | 12/2015 | Giacotto et al. |
| 2017/0285145 A1 | 10/2017 | Kriebernegg et al. |
| 2018/0120424 A1* | 5/2018 | Eshel ............... G01S 7/4808 |
| 2018/0259645 A1 | 9/2018 | Shu et al. |
| 2018/0284237 A1 | 10/2018 | Campbell et al. |
| 2018/0284244 A1 | 10/2018 | Russell et al. |
| 2019/0293770 A1* | 9/2019 | Subasingha ........... G01S 7/4868 |
| 2020/0141716 A1* | 5/2020 | Droz ................. G01S 7/4817 |

FOREIGN PATENT DOCUMENTS

| | | |
|---|---|---|
| WO | 02/101340 A2 | 12/2002 |
| WO | 2018/197441 A1 | 11/2018 |
| WO | 2019/197243 A1 | 10/2019 |

\* cited by examiner

RETROREFLECTOR DETECTION AND AVOIDANCE IN A LIDAR DEVICE

CROSS-REFERENCE TO RELATED APPLICATIONS

This application claims priority to U.S. Provisional Patent Application No. 62/941,989, filed Nov. 29, 2019, which is incorporated herein by reference.

BACKGROUND

Unless otherwise indicated herein, the materials described in this section are not prior art to the claims in this application and are not admitted to be prior art by inclusion in this section.

Light detection and ranging (LIDAR) devices may estimate distances to objects in a given environment. For example, an emitter subsystem of a LIDAR device may emit near-infrared light pulses, which may interact with objects in the device's environment. At least a portion of the light pulses may be redirected back toward the LIDAR (e.g., due to reflection or scattering) and detected by a detector subsystem. Conventional detector subsystems may include a plurality of detectors and a corresponding controller configured to determine an arrival time of the respective light pulses with high temporal resolution. The distance between the LIDAR device and a given object may be determined based on a time of flight of the corresponding light pulses that interact with the given object.

SUMMARY

In a first aspect, a method is provided. The method involves emitting, by a light emitter of a light detection and ranging (LIDAR) device, a first light pulse into a field of view. The method further involves determining that a detector of the LIDAR device detects, during a first measurement period, at least one reflected light pulse indicative of reflection by a retroreflector or other highly reflective object. The detector is configured to detect light from within the field of view. The method additionally involves, in response to detecting the at least one reflected light pulse indicative of reflection by a retroreflector or other highly reflective object, deactivating the light emitter during one or more subsequent measurement periods. The one or more subsequent measurement periods occur after the first measurement period.

In a second aspect, a light detection and ranging (LIDAR) device is provided. The LIDAR device includes a light emitter configured to emit light pulses into a field of view, a detector configured to detect light from within the field of view, and a controller configured to perform operations. The operations include: (i) controlling the light emitter to emit a first light pulse into the field of view; (ii) determining that the detector detects, during a first measurement period, at least one reflected light pulse indicative of reflection by a retroreflector or other highly reflective object; and (iii) in response to detecting the at least one reflected light pulse indicative of reflection by a retroreflector or other highly reflective object, deactivating the light emitter during one or more subsequent measurement periods. The one or more subsequent measurement periods occur after the first measurement period.

In some embodiments, the operations may further include determining when to reactivate the light emitter. Determining when to reactivate the light emitter may involve determining whether the detector detects, during a second measurement period that occurs after the first measurement period, an additional light pulse indicative of reflection by a retroreflector or other highly reflective object. In response to a determination that the detector detects, during the second measurement period, an additional light pulse indicative of reflection by a retroreflector or other highly reflective object, the light emitter is deactivated during a third measurement period that occurs after the second measurement period. In response to a determination that the detector does not detect, during the second measurement period, an additional light pulse indicative of reflection by a retroreflector or other highly reflective object, the light emitter is reactivated during a third measurement period that occurs after the second measurement period.

In some embodiments, the light emitter emits the first light pulse during the first measurement period, and determining that the detector detects, during the first measurement period, at least one reflected light pulse indicative of reflection by a retroreflector or other highly reflective object involves: determining that the detector detects a reflected light pulse during the first measurement period; and determining that the reflected light pulse is indicative of reflection by a retroreflector or other highly reflective object based on at least a shape of the reflected light pulse.

In some embodiments, the light emitter is a primary light emitter, the LIDAR device also includes a secondary light emitter, and the primary light emitter emits the first light pulse during a preceding measurement period that occurs before the first measurement period. The operations further include: controlling the secondary light emitter to emit a secondary light pulse during the first measurement period, wherein the secondary light pulse has a lower intensity than the first light pulse; and controlling the primary light emitter to not emit light during the first measurement period. Further, determining that the detector detects, during the first measurement period, at least one reflected light pulse indicative of reflection by a retroreflector or other highly reflective object may include: determining that the detector detects a reflected light pulse during the first measurement period; and determining that reflected light pulses is indicative of reflection by a retroreflector or other highly reflective object based on at least the reflected light pulse having a magnitude that exceeds a predetermined threshold.

In some embodiments, the light emitter is a primary light emitter, the LIDAR device also includes a secondary light emitter, the primary light emitter emits the first light pulse during the first measurement period, and the operations include controlling the secondary light emitter to emit a secondary light pulse during the first measurement period, wherein the first light pulse and the secondary light pulse are separated in time by a predetermined time difference, and wherein the secondary light pulse has a lower intensity than the first light pulse. Further, determining that the detector detects, during the first measurement period, at least one reflected light pulse indicative of reflection by a retroreflector or other highly reflective object comprises: determining that the detector detects a first reflected light pulse at a first time during the first measurement period and a second reflected light pulse at a second time during the first measurement period; and determining that the first and second reflected light pulses are indicative of reflection by a retroreflector or other highly reflective object based on at least a time difference between the first time and the second time corresponding to the predetermined time difference.

In some embodiments, the operations further include: transmitting, from the LIDAR device to a computing device, information indicative of the retroreflector or other highly reflective object being within the field of view of the light emitter and detected during the first measurement period.

In a third aspect, a method for scanning an environment of an autonomous vehicle is provided. The method may include determining portions of the environment that may include retroreflectors. Determining portions of the environment that may include retroreflectors may include determining that a reflected light pulse is indicative of reflection by a retroreflector based on at least a shape of the reflected light pulse. The method may further include selectively changing capabilities of a LIDAR to scan those portions. Selectively changing capabilities of the LIDAR to scan those portions may include selectively preventing the LIDAR from transmitting light to those portions of the environment that may include retroreflectors. Selectively preventing the LIDAR from transmitting light to those portions of the environment that may include retroreflectors may include selectively preventing one or more transmitters from emitting light at a certain time. Selectively changing capabilities of the LIDAR to scan those portions may alternatively or additionally include emitting, by the same or a secondary light emitter, a secondary light pulse, wherein the secondary light pulse has a lower intensity than a first light pulse.

In a fourth aspect, a method for LIDAR-to-LIDAR communication is provided. The method involves receiving, by a computing device, data from a first LIDAR device coupled to a vehicle, wherein the data comprises information indicative of a location of a retroreflector detected by the first LIDAR device. The method further involves determining, by the computing device, that the location of the retroreflector is within a field of view of a second LIDAR device coupled to the vehicle. The method additionally involves transmitting, by the computing device, a message to the second LIDAR device, wherein the message comprises information indicative of the retroreflector being within the field of view the second LIDAR device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 6A illustrates the scenario at a first point in time.
FIG. 6B illustrates the scenario at a second point in time.
FIG. 6C illustrates the scenario at a third point in time.

FIG. 7A is a timing diagram for a first measurement period in the scenario. FIG. 7B is a timing diagram for a second measurement period in the scenario. FIG. 7C is a timing diagram for a third measurement period in the scenario. FIG. 7D is a timing diagram for a fourth measurement period in the scenario.

FIG. 8A is a timing diagram for a first measurement period in the scenario. FIG. 8B is a timing diagram for a second measurement period in the scenario. FIG. 8C is a timing diagram for a third measurement period in the scenario. FIG. 8D is a timing diagram for a fourth measurement period in the scenario.

FIG. 9A is a timing diagram for a first measurement period in the scenario. FIG. 9B is a timing diagram for a second measurement period in the scenario. FIG. 9C is a timing diagram for a third measurement period in the scenario. FIG. 9D is a timing diagram for a fourth measurement period in the scenario.

DETAILED DESCRIPTION

Figure 1:
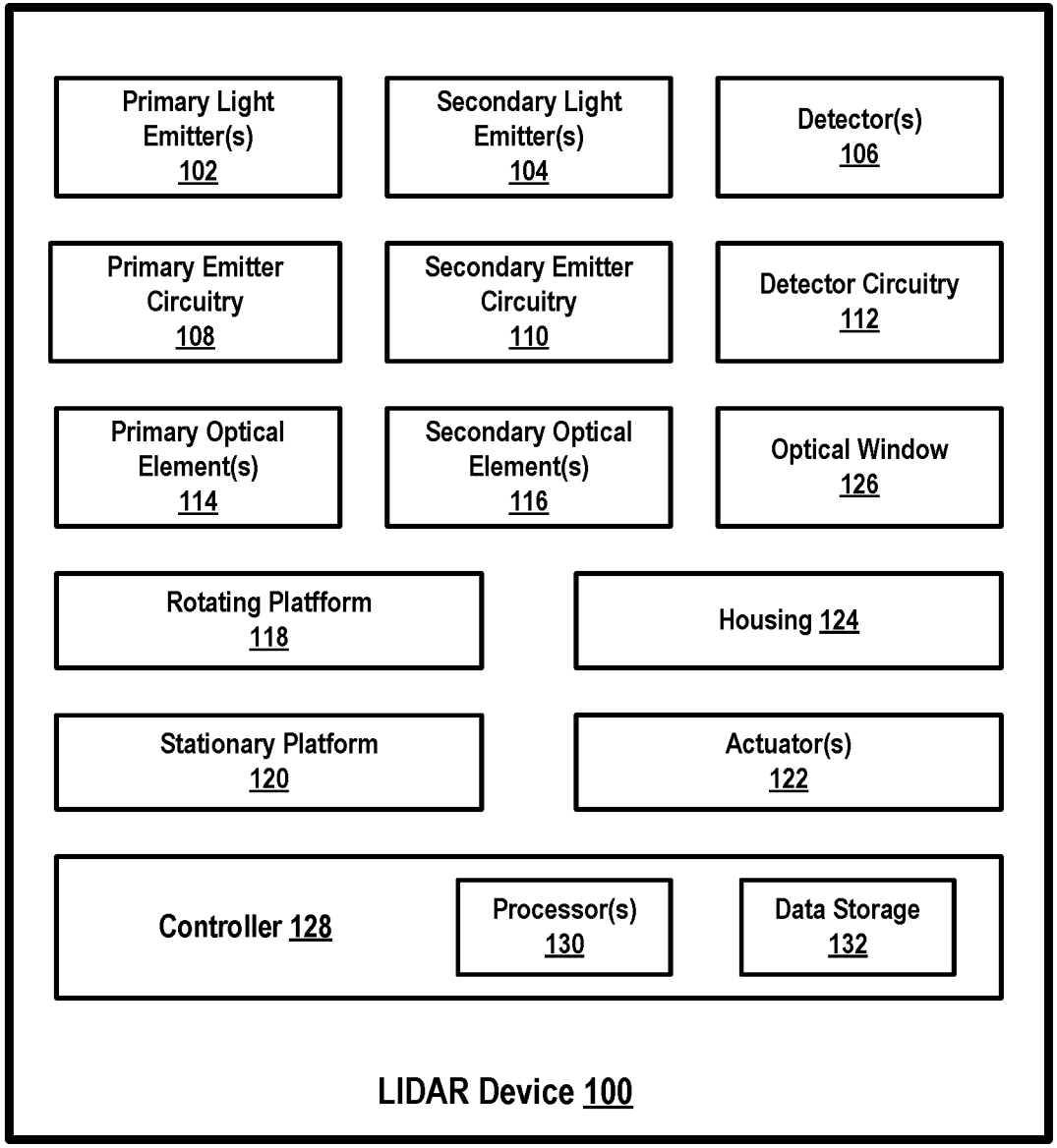
FIG. 1 is a simplified block diagram of a LIDAR device, according to an example embodiment.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein and illustrated in the figures, can be arranged, substituted, combined, separated, and designed in a wide variety of different configurations.

I. OVERVIEW

A light detection and ranging (LIDAR) device may include one or more light emitters configured to emit light pulses into an environment of the LIDAR device and one or more detectors configured to detect returning light pulses that correspond to reflections of the emitted light pulses by one or more objects in the environment. A time difference between a time when a light pulse is emitted and a time when a reflection of the light pulse is detected can be used to determine a distance between the LIDAR device and an object that reflected the light pulse. In addition, a direction to the object can be determined based on the direction in which the light emitter emitted the light pulse. The direction to the object could be characterized, for example, in terms of an azimuthal or yaw angle (e.g., an angle in a horizontal plane) and/or an elevational angle (e.g., an angle with respect to a horizontal plane).

In some implementations, a LIDAR device may emit and detect light pulses in successive measurement periods. Each measurement period may include an emission period in which the light emitter emits a light pulse followed by a detection period in which the detector "listens" for any returning light pulses. In some embodiments, the direction in which the light emitter emits the light pulse may change from one measurement period to another (e.g., due to rotation or other motion of the LIDAR device, deflection by a mirror or other beam-steering device, or in some manner). In this way, the LIDAR device may scan a portion of its environment.

In some implementations, a LIDAR device may include multiple light emitters and multiple detectors. Each light emitter may be configured to emit light pulses in a different direction, and each detector may be configured to detect reflected light pulses coming from a different direction. The different directions corresponding to the multiple light emitters and detectors may cover a range of azimuthal angles and/or a range of elevational angles. In practice, the emitted light pulses from a light emitter may have a beam width that defines a field of view of the light emitter. Similarly, each detector may be configured to detect light coming from a range of directions that defines a field of view of the detector. The respective fields of view of the light emitters could be either overlapping or non-overlapping, and the respective fields of view of the detectors could be either overlapping or non-overlapping. In some implementations, each light emitter may be paired with a corresponding detector that has the same or similar field of view as the light emitter. A light emitter paired with a corresponding detector may define a transmit/receive channel of the LIDAR device. Thus, a LIDAR device that includes multiple light emitters and multiple detectors may have multiple transmit/receive channels, with each channel having a respective field of view that makes up a portion of an overall field of view of the LIDAR device.

In general, the intensity of a reflected light pulse that is detected by the detector is dependent upon various factors that include the intensity of the emitted light pulse, the distance to the object that reflects the light pulse, the angle of incidence relative to the surface of the object, the reflectivity of the surface of the object, and whether the surface of the object reflects light diffusely (e.g., in a Lambertian reflectance pattern) or specularly (like a mirror). Assuming that other factors are equal, more reflective objects typically result in higher intensity reflected light pulses than less reflective objects. An object with a sufficiently high reflectivity (e.g., a reflectivity that is greater than 80%, greater than 90%, greater than 95%, or greater than 99%, depending on the application) may be classified as a "highly reflective object" such as a "retroreflector." Further, if the term "reflectivity" is defined as effective Lambertian reflectivity, then a "retroreflector" may have a reflectivity that is greater than 100%. Common examples of retroreflectors include road signs, lane markers, and front, side, and rear reflectors on cars, trucks, bicycles and other vehicles. In some instances, the reflected light pulses from retroreflectors or other highly reflective objects can be so intense as to cause various problems with the desired operation of a LIDAR device.

One problem that can be caused by retroreflectors or other highly reflective objects is range aliasing. This problem can arise when a light pulse emitted in a first measurement period is reflected by a retroreflector that is sufficiently distant that the reflected light pulse is detected in a second measurement period. When this occurs, it may be difficult to determine whether the reflected light pulse is a reflection of the light pulse emitted during the first measurement period or the light pulse emitted during the second measurement period. This, in turn, can create ambiguity as to how to determine the distance to the object that generated the reflected light pulse.

Another problem that can be caused by retroreflectors or other highly reflective objects is cross-talk. As noted above, a LIDAR device may include multiple light emitters and multiple detectors that are arranged to provide multiple transmit/receive channels, with each channel having a respective field of view. In practice, however, a small amount of light from one channel may be scattered into another channel. In some cases, such scattering may be the result of incomplete isolation between the channels within the LIDAR device. Alternatively or additionally, scattering may occur at the surfaces of windows, lenses, or other optical components (e.g., due to scratches, streaks, water droplets, or other imperfections or debris) of the LIDAR device. It is also possible for scattering to occur outside of the LIDAR device. For example, fog, rain, and snow can scatter light.

Such scattering can affect light that is transmitted from the LIDAR device into the environment of the LIDAR device and can also affect light that is received by the LIDAR device from the environment. With regard to transmitted light, some of the light emitted in a first channel may be scattered into the field of view of a second channel (e.g., a neighboring channel). The stray light that results from this scattering may be reflected by an object in the field of the view of the second channel, which may result in reflected stray light from the object being detected by the detector in the second channel. With regard to received light, some of the light reflected by an object in the field of view of a first channel may be scattered into the field of view of a second channel. The stray light that results from this scattering may be detected by the detector in the second channel.

To address the possibility of light from one channel being scattered into another channel, a threshold may be used to determine whether to use a detected light pulse for distance determination. In this approach, if a detector detects a light pulse that exceeds the threshold (e.g., the height, integrated area, or other measure of the magnitude of the pulse exceeds the threshold), then the detected light pulse may be regarded as a reflection of the light pulse emitted by the detector's corresponding light emitter and, on that basis, may be used for distance determination. On the other hand, if a detector detects a light pulse that does not exceed the threshold, then the light pulse may be considered the result of scattered light or noise and, on that basis, not used for distance determination.

This threshold approach, however, may be insufficient when a retroreflector or other highly reflective objects is within a particular channel's field of view. When the light emitter in the particular channel emits a light pulse toward a reflector, the intensity of the reflected light pulse from the retroreflector can be sufficiently high that scattering of the reflected light into one or more other channels may result in a detector in one of the other channels detecting a light pulse that exceeds the threshold. This, in turn, may result in a spurious distance determination. Further, even when the light emitter in the particular channel is turned off, a significant amount of stray light may reach the retroreflector due to scattering of light emitted in other channels. The retroreflector may reflect this stray light, resulting in the detector in the particular channel detecting a light pulse that exceeds the threshold.

In addition to range aliasing and cross-talk, retroreflectors or other highly reflective objects can result in detector saturation, blooming, and other types of errors in a LIDAR device.

To mitigate errors that can be caused by retroreflectors or other highly reflective objects, disclosed herein are methods and systems for detecting when a retroreflector or other highly reflective object is in a light emitter's field of view, for deactivating a light emitter when a retroreflector or other highly reflective object is in the light emitter's field of view, and for reactivating a light emitter when the retroreflector or other highly reflective objects is no longer in the light emitter's field of view.

In some examples, a retroreflector or other highly reflective object may be detected based on a characteristic shape of a reflected light pulse. If a detector detects, during a first measurement period, a reflected light pulse that is indicative of reflection by a retroreflector or other highly reflective object based on the shape of the reflected light pulse, the detector's corresponding light emitter may be deactivated during one or more subsequent measurement periods. Deactivating the light emitter during the one or more subsequent measurement periods may involve controlling the light emitter so that it does not emit light during the one or more subsequent measurement periods (e.g., does not illuminate the retroreflector). Alternatively, deactivating the light emitter during the one or more subsequent measurement periods could involve controlling the light emitter such that the light emitter emits light at a reduced level (e.g., light pulses with a reduced pulse energy and/or intensity) during the one or more subsequent measurement periods. Advantageously, even though the light emitter may still emit some light toward the retroreflector, the reduced level of light emission can be sufficiently low that cross-talk is greatly reduced or eliminated.

In some examples, a secondary light emitter may be used to detect retroreflectors or other highly reflective objects. The secondary light emitter may emit secondary light pulses that have a low intensity in comparison to light pulses emitted by a primary light emitter used for distance determinations. In addition, the secondary light emitter may emit the secondary light pulses into a wide field of view that encompasses the fields of view of the LIDAR device's various transmit/receive channels. Consequently, the detector in any of the channels could potentially detect a reflected light pulse that results from reflection of a secondary light pulse. However, the intensity of the secondary light pulse may be sufficiently low that a detector would typically detect a reflected light pulse (e.g., detect above a threshold) only when the secondary light pulse is reflected by a retroreflector or other highly reflective object in the detector's field of view.

In one approach, the secondary light emitter emits a secondary light pulse during a first measurement period in which the primary light emitters of the transmit/receive channels do not emit light. If a detector detects, during the first measurement period, a reflected light pulse that has a magnitude (e.g., a peak value or integrated area) that exceeds a threshold, then the reflected light pulse is indicative of reflection by a retroreflector or other highly reflective object. In response, the detector's corresponding primary light emitter may be deactivated during one or more subsequent measurement periods.

In another approach, a primary light emitter emits a primary light pulse and a secondary light emitter emits a secondary light pulse during a first measurement period. The primary and secondary light pulses are separated in time by a predetermined time difference. If the primary light emitter's corresponding detector detects, during the first measurement period, two reflected light pulses that are separated in time by the predetermined time difference, then the two reflected light pulses are indicative of reflection by a reflector or other highly reflective object. In response, the detector's corresponding primary light emitter may be deactivated during one or more subsequent measurement periods.

When a light emitter is deactivated for one or more subsequent measurement periods, the light emitter's corresponding detector may continue to detect light in each subsequent measurement period. If the detector detects a reflected light pulse indicative of reflection by a retroreflector or other highly reflective object during a subsequent measurement period, then the retroreflector is still in the light emitter's field of view. In response, the light emitter remains deactivated. If, however, the detector does not detect a reflected light pulse indicative of reflection by a retroreflector or other highly reflective object during a subsequent measurement period, then the retroreflector is no longer in the light emitter's field of view. In response, the light emitter may be reactivated.

II. EXAMPLE SYSTEMS

FIG. 1 is a simplified block diagram of a LIDAR device 100, according to example embodiments. As shown, LIDAR device 100 includes one or more primary light emitters 102, one or more secondary light emitters 104, one or more detectors 106, primary emitter circuitry 108, secondary emitter circuitry 110, detector circuitry 112, one or more primary optical elements 114, one or more secondary optical elements 116, an optical window 118, a housing 120, a rotating platform 122, a stationary platform 124, one or more actuators 126, and a controller 128. In some embodiments, system 100 may include more, fewer, or different components. Additionally, the components shown may be combined or divided in any number of ways.

The primary light emitter(s) 102 are configured to emit light, for example, in the form of pulses. Each light pulse could have a duration that is suitable for determining distances to objects in the environment. For example, each light pulse could have a duration that is between 2 nanoseconds and 5 nanoseconds. Other pulse durations are possible as well. The light emitted by the primary light emitter(s) 102 could have a narrow range of wavelengths. For example, the primary light emitter(s) 102 could include laser diodes, laser diode bars, vertical cavity surface emitting lasers (VCSEL), fiber lasers, or other narrowband light sources. Alternatively, the primary light emitter(s) 102 could emit light with a broader range of wavelengths. For example, the primary light emitter(s) 102 could include light emitting diodes (LEDs). Other types of light sources are possible as well. The wavelengths emitted by the primary light emitter(s) 102 could be, for example, in the ultraviolet, visible, and/or infrared portions of the electromagnetic spectrum. In an example embodiment, the primary light emitter(s) 102 include laser diodes that emit light at a wavelength of about 905 nanometers.

In some embodiments, LIDAR device 100 may include only one primary light emitter 102. In other embodiments, LIDAR device 100 may include a plurality of primary light emitters 102. Each primary light emitter in the plurality of primary light emitters 102 may be configured to emit light that illuminates a respective field of view, for example, based on a location of the primary light emitter relative to the primary optical element(s) 114. The respective fields of view of the primary light emitters 102 could be either overlapping or non-overlapping.

The secondary light emitter(s) 104 are configured to emit light, for example, in the form of pulses. The light pulses emitted by the secondary light emitter(s) 104 could have the same or similar duration as the light pulses emitted by the primary light emitter(s) 102, but could have a higher or lower pulse energy. For example, a primary light emitter 102 may emit light pulses with a pulse energy of about 76 nJ, whereas a secondary light emitter 104 may emit light pulses with a pulse energy of about 1 µJ. Although the pulse energy may be higher, the intensity of the light from a secondary light emitter 104 may be lower than that of a primary light emitter 102 because the light from the secondary light emitter 104 may be spread out over a wider field of view (e.g., by the secondary optical element(s) 116). The wavelengths of light emitted by the secondary light emitter(s) 104 could be the same as or similar to the wavelengths of light emitted by the primary light emitter(s) 102. In an example embodiment, both the primary light emitter(s) 102 and the secondary light emitter(s) 104 emit light in the near-infrared range. Like the primary light emitter(s) 102, the secondary light emitter(s) 104 may include narrowband light sources, such as laser diodes, laser diode bars, VCSELs, or fiber lasers, or broadband light sources, such as LEDs. Other types of light sources are possible as well.

In an example embodiment, LIDAR device 100 includes only one secondary light emitter 104. The single secondary light emitter 104 may be configured to emit light that illuminates a field of view that encompasses the respective fields of view of the primary light emitter(s) 102. The light from the secondary light emitter 104 may have a lower intensity than the light from each of the primary light emitter(s) 102 due to the light being spread out over a wider field of view. In such embodiments, the secondary light emitter 104 may be described as a "flash illuminator" or "flood illuminator."

The detector(s) 106 could include any type of light detector that is arranged to intercept and detect reflections of light emitted by primary light emitter(s) 102 and secondary light emitter(s) 104 that return to the LIDAR device 100 from the environment. Example detector(s) 106 include photodiodes, avalanche photodiodes (APDs), silicon photomultipliers (SiPMs), single photon avalanche diodes (SPADs), multi-pixel photon counters (MPPCs), phototransistors, active pixel sensors (APS), charge coupled devices (CCD), cryogenic detectors, and/or any other detector that can detect light having the wavelengths emitted by the primary light emitter(s) 102 and secondary light emitter(s) 104.

In example embodiments, the detector(s) 106 are paired with the primary light emitter(s) 102 to form a plurality of transmit/receive channels. In each transmit/receive channel, the primary light emitter is configured to emit light into a respective field of view and the detector that is paired with the primary light emitter is configured to receive and detect light from the same or similar field of view.

The primary emitter circuitry 108 includes circuitry that can selectively activate and deactivate individual primary light emitters in the primary light emitter(s) 102 for particular measurement periods, for example, under the control of the controller 128. To activate a selected primary light emitter for a particular measurement period, the primary emitter circuitry 108 may include a capacitor (or other energy storage device) that is charged up and then discharged such that a current flows through the selected primary light emitter. The current flowing through the selected primary light emitter causes the selected primary light emitter to emit a light pulse during the particular measurement period. To deactivate a selected primary light emitter for a particular measurement period, the primary emitter circuitry 108 could either not charge up the capacitor or could charge up the capacitor and then discharge the capacitor in such a way that little or no current flows through the selected primary light emitter (e.g., the capacitor could be discharged through a current path that does not flow through the selected primary light emitter). As a result, the selected primary light emitter does not emit a light pulse (or emits a light pulse that has a reduced intensity or pulse energy) during the particular measurement period.

The secondary emitter circuitry 110 includes circuitry that causes one or more of the secondary light emitter(s) 104 to emit a light pulse in one or more measurement periods. In some embodiments, the secondary emitter circuitry 110 causes a secondary light emitter 104 to emit a light pulse during a specialized measurement period in which the primary light emitter(s) 102 do not emit light. Such a specialized measurement period may be used to map out the locations of retroreflectors in the environment based on reflections of the light pulse emitted by the secondary light emitter(s) 104 that are detected by the detector(s) 106. The specialized measurement period may be followed by one or more standard measurement periods. In a standard measurement period, the primary light emitter(s) 102 can be selectively activated to emit light pulses or deactivated to avoid illuminating retroreflectors while the secondary light emitter(s) 104 do not emit light.

In other embodiments, the secondary emitter circuitry 110 controls the secondary light emitter(s) 104 to emit a light pulse in each measurement period. For example, during each measurement period, the secondary emitter circuitry 110 may cause a secondary light emitter 104 to emit a light pulse a certain period of time (e.g., 50 nanoseconds) after the light pulses are emitted by the primary light emitter(s) 102. Alternatively, the secondary emitter circuitry 110 may cause a secondary light emitter 104 to emit a light pulse before or at the same time the light pulses are emitted by the primary light emitter(s) 102.

The detector circuitry 112 is configured to output a respective signal based on light detected by each of the detector(s) 106. For example, the detector circuitry 112 may include for each of the detector(s) 106 a respective analog-to-digital converter (ADC) that is configured to sample the output of the detector at various times so as to output at each time a digital value that corresponds to the detected light signal (e.g., a current resulting from detected photons). The sampling rate of the ADC may be selected based on the pulse duration of the emitted light pulses so as to obtain multiple samples for each reflected pulse. For example, if the emitted light pulses have a pulse duration of 2 nanoseconds, the ADC may sample the output of a detector every 100 to 500 picoseconds. The digital values determined in this way may be used to determine the shape of a reflected light pulse detected by a detector as a function of time (e.g., including a rising edge, a peak, and a falling edge).

The primary optical element(s) 114 may include one or more lenses, mirrors, light guides, apertures, diffusers, and/or other optical elements that direct light emitted by the primary light emitter(s) 102 into an environment of the LIDAR device 100 and that direct reflected light from the environment to the detector(s) 106. In example embodiments, the primary optical element(s) 114 pair the primary light emitter(s) 102 with the detector(s) 106 to form one or more transmit/receive channels. In such embodiments, each transmit/receive channel is associated with a respective field of view, and the primary optical element(s) 114 direct light from the primary light emitter of a channel into the channel's particular field of view and direct reflected light from within the channel's particular field of view to the corresponding detector of the channel.

The secondary optical element(s) 116 may include one or more lenses, mirrors, light guides, apertures, diffusers, and/or other optical elements that direct light emitted by the secondary light emitter(s) 104 into an environment of the LIDAR device 100. In example embodiments, the secondary optical element(s) 116 spread out the light emitted by a secondary light emitter 104 into a field of view that encompasses the respective fields of view of the primary light emitter(s) 102 and the detector(s) 106.

In some embodiments, the LIDAR device 100 is configured to rotate. As shown in FIG. 1, LIDAR device 100 includes rotating platform 118 that rotates relative to stationary platform 120 under the control of actuator(s) 122. The stationary platform 120 could be, for example, mounted on a vehicle. The primary light emitter(s) 102, secondary light emitter(s) 104, detector(s) 106, primary emitter circuitry 108, secondary emitter circuitry 110, detector circuitry 112, primary optical element(s) 114, and secondary optical element(s) 116 could be mounted on or coupled to the rotating platform 118. The actuator(s) 122 may include one or more motors, pneumatic actuators, hydraulic pistons, and/or piezoelectric actuators, and/or any other types of actuators. The actuator(s) 122 may be operated (e.g., by controller 128) to cause the rotating platform 118 to rotate about an axis of rotation. In some embodiments, the axis of rotation may be a vertical axis. For example, the LIDAR device 100 may be mounted on a vehicle, and the axis of rotation may be generally perpendicular to the road surface on which the vehicle is operating. In some embodiments, the rotating platform 118 may rotate through a full 360 degrees at a rate of 3-30 Hz. Other rates of rotation are possible as well. In other embodiments, the rotating platform 118 may rotate less than 360 degrees. For example, the rotating platform 118 may swivel back and forth within a range of angles. In some embodiments, the rotating platform 118 may continuously rotate the LIDAR device 100 during a plurality of measurement periods. In other embodiments, the rotating platform 118 may not provide continuous rotation but may instead be used to adjust the orientation of the LIDAR device 100 at various times (e.g., in response to identifying certain regions of interest in the environment).

As shown in FIG. 1, the LIDAR device 100 includes a housing 124 that encloses the primary light emitter(s) 102, secondary light emitter(s) 104, detector(s) 106, primary emitter circuitry 108, secondary emitter circuitry 110, detector circuitry 112, primary optical element(s) 114, and secondary optical element(s) 116. The housing 124 may be coupled to the rotating platform 118. In some embodiments, the housing 124 may be transparent to the light emitted by the primary light emitter(s) 102 and the secondary light emitter(s) 104. In other embodiments, the housing 124 may be opaque but may include an optical window 126 that is transparent to the light emitted by the primary light emitter(s) 102 and the secondary light emitter(s) 104. For example, the primary optical element(s) 114 and the secondary optical element(s) 116 may be arranged so as to direct light emitted by the primary light emitter(s) 102 and the secondary light emitter(s) 104 through the optical window 126 into the environment of the LIDAR device 100 and may be arranged so as direct to the detector(s) 106 reflected light from the environment that enters the LIDAR device 100 through the optical window 126.

In some embodiments, the primary optical element(s) 114 may define a first optical path from the primary light emitter(s) 102 to the optical window 126 and the secondary optical element(s) 116 may define a second optical path from the secondary light emitter(s) 104 to the optical window 126. The first and second optical paths could be separate. Alternatively, the first and second optical paths could be partially overlapping.

Controller 128 may include one or more processors 130 and data storage 132. The processor(s) 130 may include one or more general-purpose processors and/or one or more special-purpose processors (e.g., digital signal processors, etc.). The data storage 132 may include or take the form of one or more non-transitory computer-readable storage media that may be read or accessed by the processor(s) 130. The data storage 132 can include volatile and/or non-volatile storage components, such as electrical, optical, magnetic, organic or other memory or disc storage, which may be integrated in whole or in part with at least one of the processor(s) 130. In addition to or instead of processor(s) 130 and data storage 132, controller 128 may include other types of analog and/or digital circuitry. For example, controller 128 may include a field-programmable gate array (FPGA) or an application-specific integrated circuit (ASIC).

In some examples, data storage 132 may store program instructions that are executable by processor(s) 130 to cause the LIDAR device 100 to perform the various operations described herein. For example, controller 128 may control the primary light emitter(s) 102 through the primary emitter circuitry 108 (e.g., to activate and deactivate individual light emitters in the primary light emitter(s) 102) and may control the secondary light emitter(s) 104 through the secondary light emitter circuitry 110. Controller 128 may also receive data from the detector circuitry 112 (e.g., ADC values with corresponding timestamps) and may analyze the data to detect reflect light pulses and to identify reflected light pulses that are indicative of reflection by a retroreflectors. Controller 128 may also control the actuator(s) 122 so as to control the rotation of the LIDAR device 100. Controller 128 may perform other operations as well. Further, in connection with certain operations, controller 128 may communicate with computing devices or other components outside of LIDAR device 100. For example, in implementations in which LIDAR device 100 is coupled to an autonomous vehicle, controller 128 may transmit data to and receive instructions from a computing device that controls the autonomous operation of the vehicle.

Figure 2:
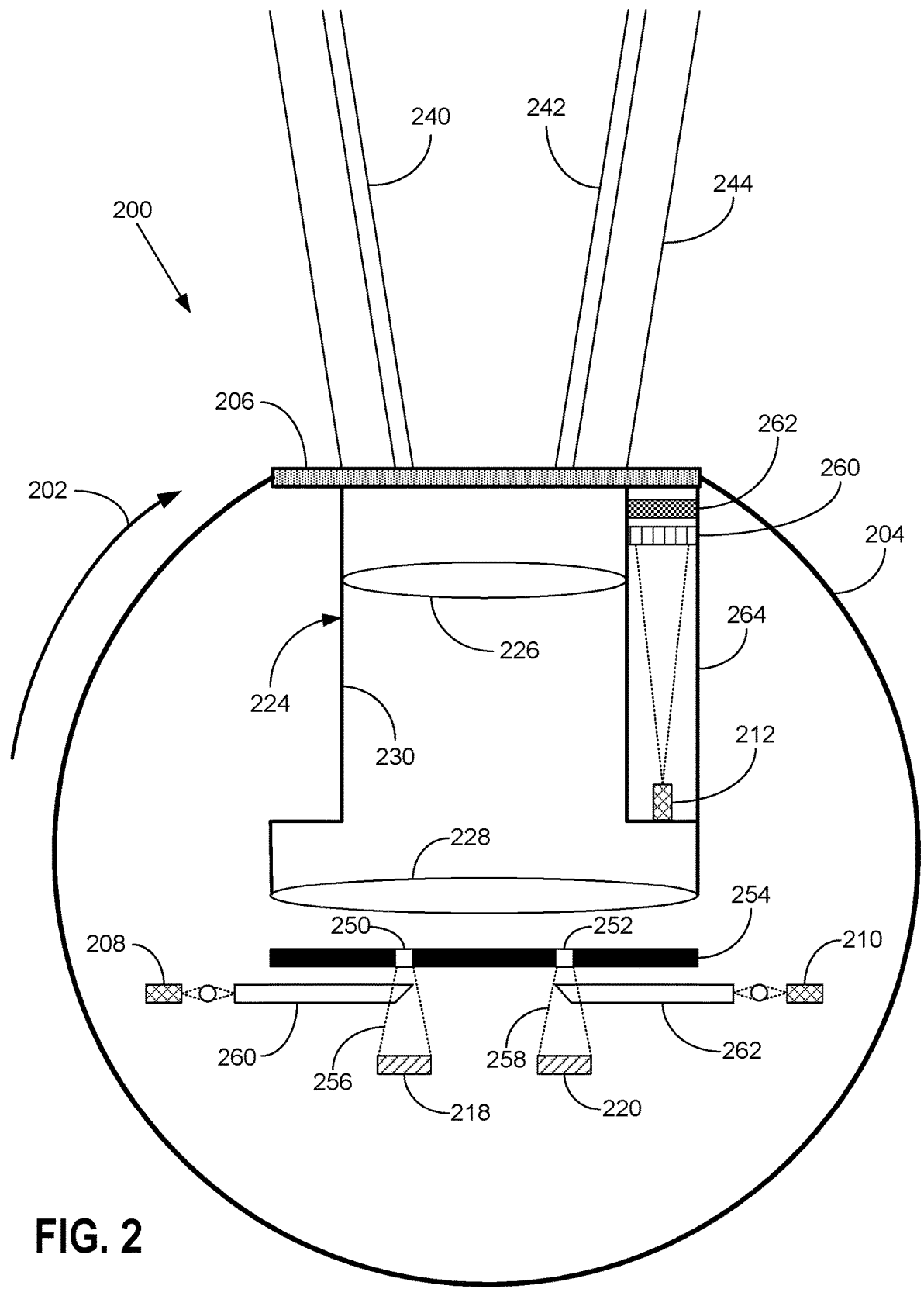
FIG. 2 illustrates a sectional view of a LIDAR device, according to an example embodiment.

FIG. 2 is a sectional view of a LIDAR device 200, according to example embodiments. In this example, LIDAR device 200 is configured to rotate about an axis of rotation in a rotation direction 202. The sectional view of FIG. 2 is in a plane perpendicular to the axis of rotation. The axis of rotation could be a vertical axis, such that the rotation in the rotation direction 202 enables the LIDAR device 200 to scan a range of azimuthal angles in the environment. Alternatively or additionally, LIDAR device 200 could rotate about a horizontal axis to scan a range of elevational angles or could be configured to scan a portion of the environment in some other way.

As shown, LIDAR device 200 includes various optical components that are enclosed within a housing 204 and an optical window 206. The optical components of LIDAR device 200 include a plurality of primary light emitters, exemplified by primary light emitters 208 and 210, a secondary light emitter 212, and a plurality of detectors, exemplified by detectors 218 and 220. In this example, primary light emitter 208 is paired with detector 218 to provide a first transmit/receive channel, and primary light emitter 210 is paired with detector 220 to provide a second transmit/receive channel. Although FIG. 2 shows two primary light emitters and two detectors, it is to be understood that LIDAR device 200 could include any number of primary light emitters and detectors to provide any number of transmit/receive channels.

In this example, LIDAR device 200 includes a telecentric lens assembly 224 that includes a plurality of lenses, exemplified by lenses 226 and 228, mounted in a lens barrel/baffle structure 230 that is coupled to the optical window 206. The telecentric lens assembly 224 is arranged to direct light emitted from the primary light emitters 208 and 210 through the optical window 206 into the environment of the LIDAR device 200, so as to illuminate fields of view 240 and 242, respectively. The telecentric lens assembly 224 is further arranged to direct reflected light from the environment that enters the LIDAR device 200 through the optical window 206 from within the fields of view 240 and 242 toward the detectors 218 and 220, respectively.

The fields of view 240 and 242 are defined, in part, by apertures 250 and 252, respectively. The apertures 250 and 252 may be pinhole apertures (e.g., with diameters between 100 microns and 500 microns) formed in an opaque material, shown as aperture plate 254. For purposes of illustration, FIG. 2 shows only two apertures. However, it is to be understood that the aperture plate 254 may include any number of apertures, with each aperture defining a respective field of view for a respective transmit/receive channel that includes a respective primary light emitter and a respective detector. The apertures in the aperture plate 254 could be arranged in a one-dimensional array, a two-dimensional array, or in some other pattern. The various fields of view of the transmit/receive channels may together provide the LIDAR device 200 with an overall field of view 244.

The apertures 250 and 252 are positioned at a focal plane of the telecentric lens assembly 224 between the telecentric lens assembly 224 and the detectors 218 and 220. With this configuration, light from the field of views 240 and 242 is focused within the apertures 250 and 252 by the telecentric lens assembly 224, and the focused light thereafter diverges toward the detectors 218 and 220. As shown, detector 218 intercepts diverging light 256 from aperture 250 and detector 220 intercepts diverging light 258 from aperture 252. Advantageously, the detectors 218 and 220 may each include an array of single photon detectors that covers an area that generally matches the area illuminated by the diverging light 256 and 258, so as to provide for single photon detection with a high dynamic range. For example, the detectors 218 and 220 may each include a SiPM.

As shown, the light emitted by the primary light emitters 208 and 210 is directed to the apertures 250 and 252 by light guides 260 and 262, respectively. More particularly, the light emitted by the primary light emitters 208 and 210 is coupled into input ends of the light guides 260 and 262 (e.g., via respective cylindrical lenses), and the light guides 260 and 262 guide the light by total internal reflection from their respective input ends to respective output ends that are positioned proximate the apertures 250 and 252. The output ends of the light guides 260 and 262 include reflective angled surfaces that reflect at least a portion of the guided light out of the light guides 260 and 262 toward the apertures 250 and 252, respectively. The telecentric lens assembly 224 collimates the light emitted from the light guides 260 and 262 through the apertures 250 and 252 and transmits the collimated light through the optical window 206 into the fields of view 240 and 242, respectively.

The secondary light emitter 212 emits light that is collimated by a Fresnel lens 260 and then diffused by a diffuser 262. The diffused light from the diffuser 262 is transmitted through the optical window 206 to illuminate a field of view, which (past a certain distance away from the LIDAR device 200) encompasses the fields of view 240 and 242 and the overall field of view 244 of the LIDAR device 200. The secondary light emitter 212, Fresnel lens 260, and diffuser 262 may be mounted to a frame 264 that is attached to the lens barrel/baffle structure 224 and coupled to the optical window 206.

Figure 3:
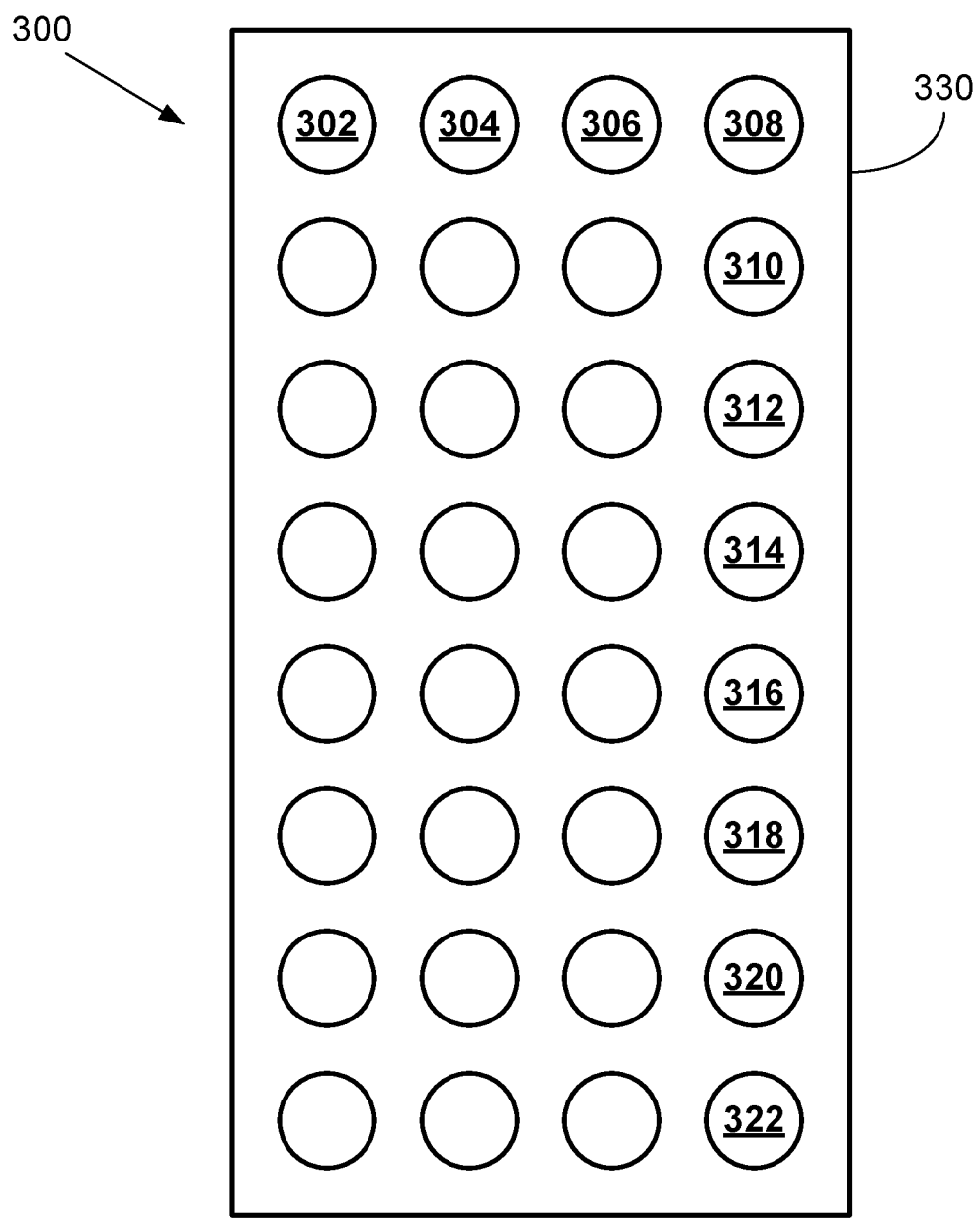
FIG. 3 illustrates an example arrangement of the fields of view (FOVs) of a plurality of transmit/receive channels of a LIDAR device, according to an example embodiment.
Figure 4A:
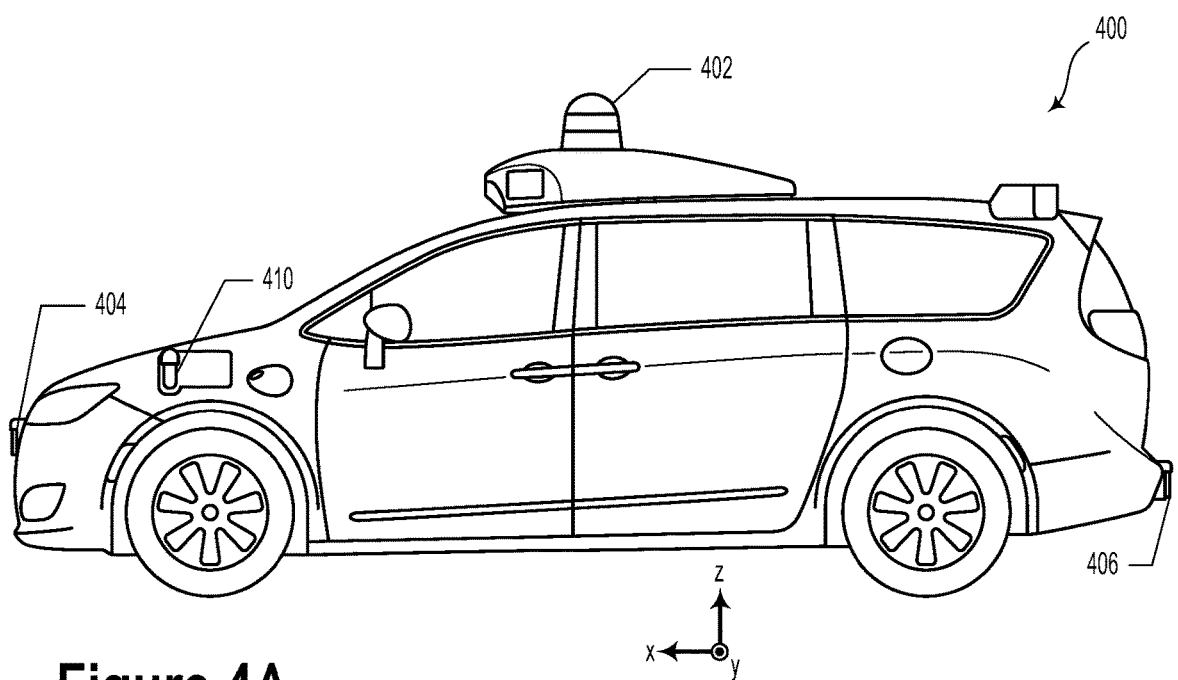
FIG. 4A illustrates a vehicle, according to an example embodiment.
Figure 4B:
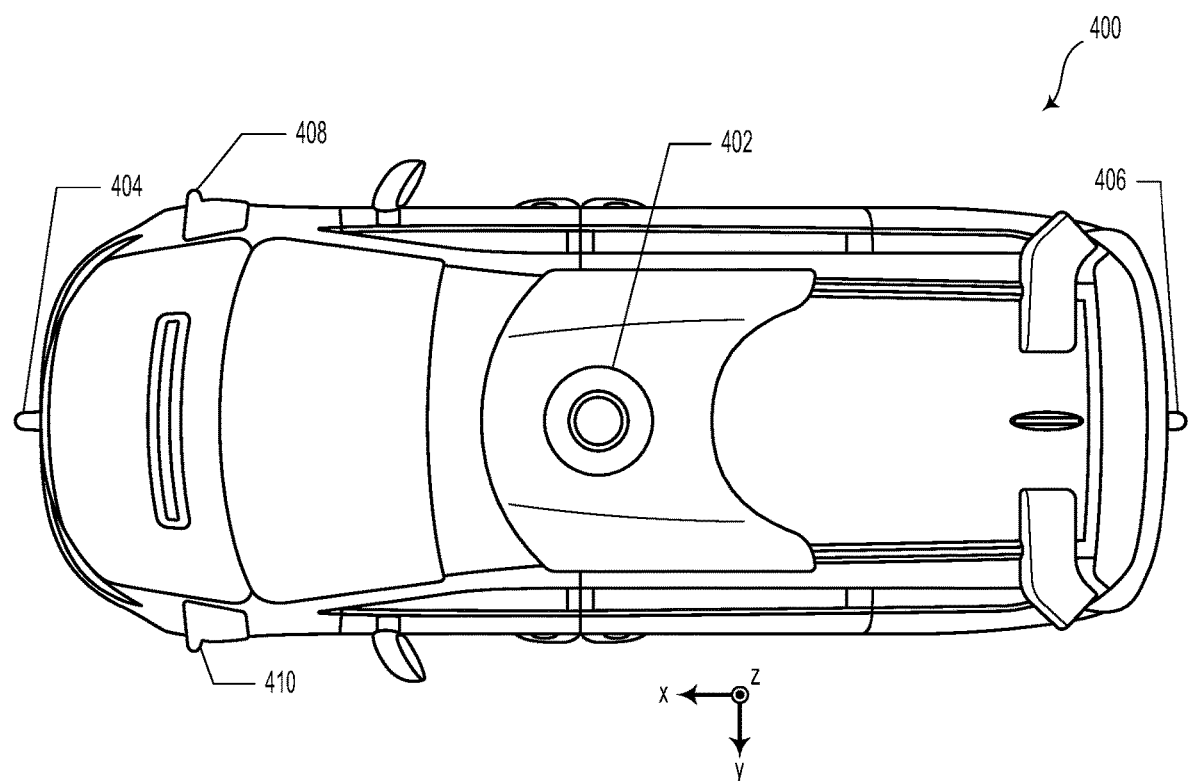
FIG. 4B illustrates a vehicle, according to an example embodiment.
Figure 4C:
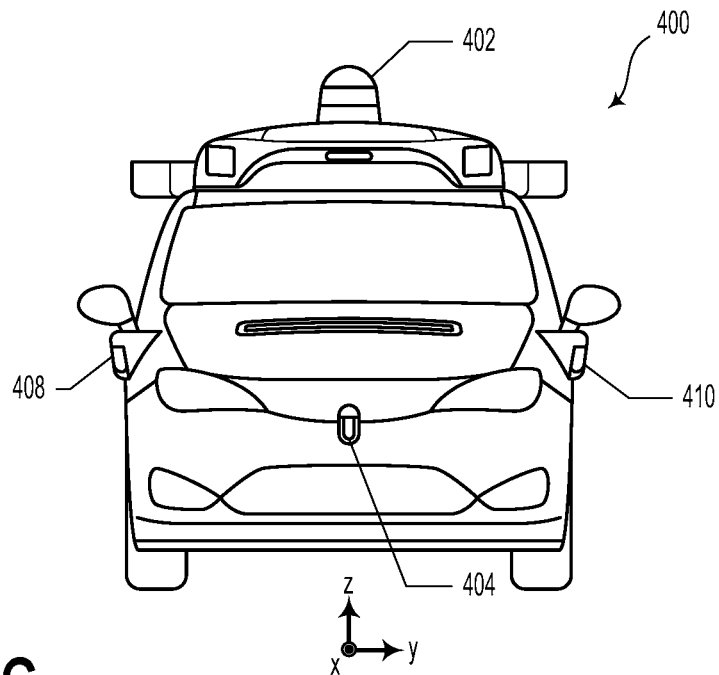
FIG. 4C illustrates a vehicle, according to an example embodiment.
Figure 4D:
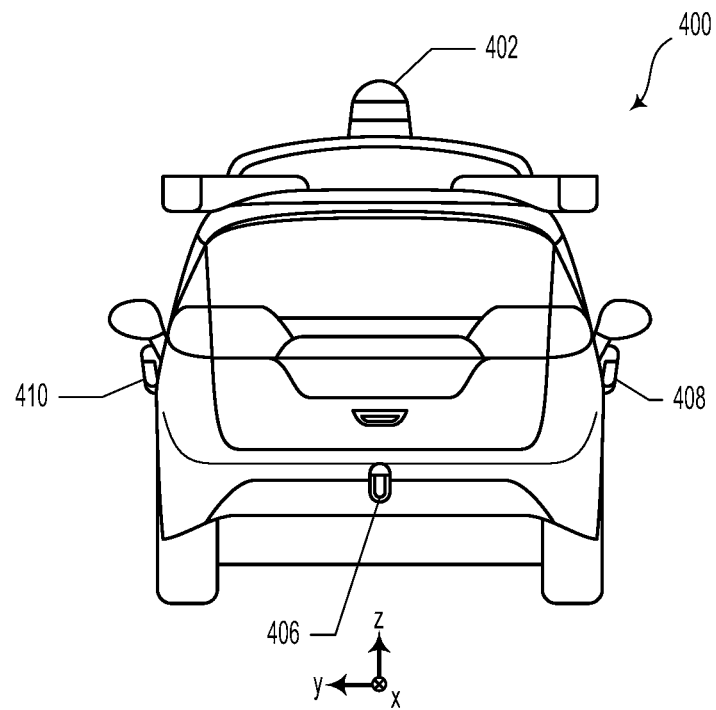
FIG. 4D illustrates a vehicle, according to an example embodiment.
Figure 4E:
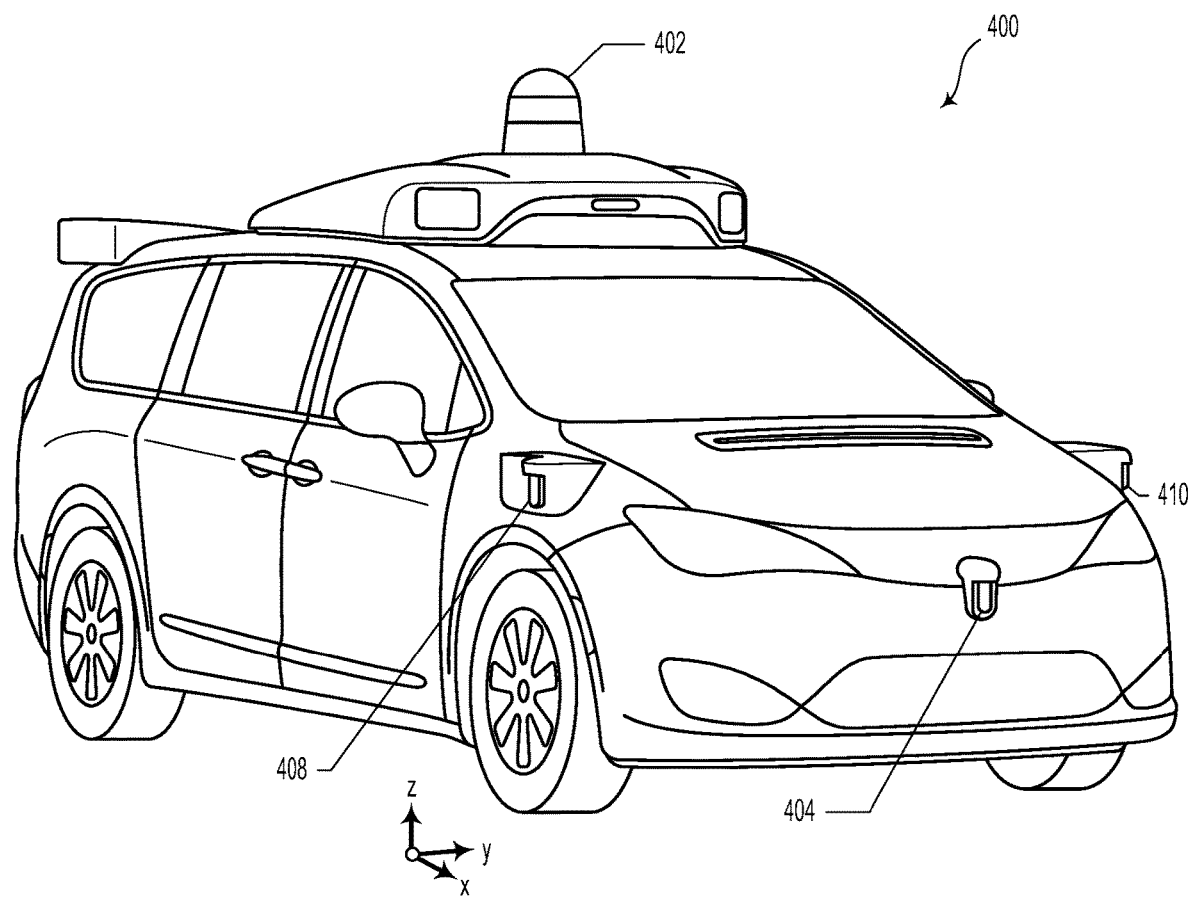
FIG. 4E illustrates a vehicle, according to an example embodiment.

FIG. 3 illustrates an example arrangement 300 of the fields of view (FOVs) of the transmit/receive channels of a LIDAR device, such as LIDAR device 100 or LIDAR device 200. In this example, the FOVs are arranged in a two-dimensional array with four FOVs arranged horizontally (exemplified by FOVs 302-308) and eight FOVs arranged vertically (exemplified by FOVs 308-322). In other examples, a greater or fewer number of FOVs could be arranged horizontally, and a greater or fewer number of FOVs could be arranged vertically. In addition, while FIG. 3 shows the FOVs arranged in a two-dimensional array, the FOVs could be arranged in a one-dimensional array or in some other pattern. In FIG. 3, each FOV is shown as being generally circular. In practice, however, the FOV of a transmit/receive channel could be elliptical, square, rectangular, trapezoidal, or some other shape.

FIG. 3 also shows a FOV 330 that corresponds to the area illuminated by one or more secondary light emitters, such as the secondary light emitter(s) 104 shown in FIG. 1 or the secondary light emitter 212 shown in FIG. 2. As shown, the FOV 330 of the secondary light emitter encompasses the FOVs of the transmit/receive channels. Further, while FOV 330 is shown in FIG. 3 as being rectangular, FOV 330 could be square, circular, elliptical, trapezoidal, or some other shape.

Because the light from the secondary light emitter is spread out over a wider FOV (e.g., FOV 330) than the FOVs of the transmit/receive channels (e.g., FOVs 302-322), the light from the secondary light emitter may have a lower intensity than the light from each of the primary light emitters. For example, the intensity of the light from the secondary light emitter may be lower by an order of magnitude, lower by two orders of magnitude, or lower by three or more orders of magnitude.

Although FIGS. 1 and 2 illustrate example configurations of LIDAR devices 100 and 200, and FIG. 3 illustrates example FOVs resulting therefrom, it is to be understood that other configurations are possible as well. For example, LIDAR devices 100 and 200 are illustrated as being able to rotate. However, non-rotating LIDAR devices are possible as well. Further, while LIDAR devices 100 and 200 include one or more secondary light emitters that are used to detect retroreflectors, some LIDAR devices may include one or more primary light emitters but not include a secondary light emitter. In such LIDAR devices, the reflected light pulses of the primary light emitters may be analyzed to determine whether they have been reflected by a retroreflector.

FIGS. 4A-4E illustrate a vehicle 400, according to an example embodiment. The vehicle 400 could be a semi- or fully-autonomous vehicle. While FIGS. 4A-4E illustrates vehicle 400 as being an automobile (e.g., a minivan), it will be understood that vehicle 400 could include another type of autonomous vehicle, robot, or drone that can navigate within its environment using sensors and other information about its environment.

The vehicle 400 may include one or more sensor systems 402, 404, 406, 408, and 410. In example embodiments, sensor systems 402, 404, 406, 408, and 410 each include a respective LIDAR device. In addition, one or more of sensor systems 402, 404, 406, 408, and 410 could include radar devices, cameras, or other sensors. In an example embodiment, sensor system 402 may be coupled to a roof of the vehicle 400, sensor system 404 may be coupled to a front side of the vehicle 400, sensor system 406 may be coupled to a rear side of the vehicle 400, sensor system 408 may be coupled to a right side of the vehicle 400, and sensor system 410 may be coupled to a left side of vehicle 400. In other embodiments, one or more sensor systems could be coupled to other portions of the vehicle.

The LIDAR devices of sensor systems 402, 404, 406, 408, and 410 may be configured to rotate about an axis (e.g., the z-axis shown in FIGS. 4A-4E) so as to illuminate at least a portion of an environment around the vehicle 400 with light pulses and detect reflected light pulses. Based on the detection of reflected light pulses, information about the environment may be determined. The information determined from the reflected light pulses may be indicative of distances and directions to one or more objects in the environment around the vehicle 400. For example, the information may be used to generate point cloud information that relates to physical objects in the environment of the vehicle 400. The information could also be used to determine the reflectivities of objects in the environment, the material composition of objects in the environment, or other information regarding the environment of the vehicle 400.

The LIDAR devices of sensor systems 402, 404, 406, 408, and 410 may have different fields of view that may be overlapping. For example, in the configuration illustrated in FIGS. 4A-4E, the LIDAR device of sensor system 402 may have a long-range field of view that extends through 360 degrees around the vehicle, whereas the LIDAR devices of sensor systems 404, 406, 408, and 410 may have shorter-range fields of view that cover respective directions in front of, behind, to the right of, and to the left of the vehicle 400. At least a portion of each respective field of view of the LIDAR devices of sensor systems 404, 406, 408, and 410 may overlap with the field of view of the LIDAR device of sensor system 402.

The information obtained from one or more of sensor systems 402, 404, 406, 408, and 410 could be used to control the vehicle 400, such as when the vehicle 400 is operating in an autonomous or semi-autonomous mode. For example, the information could be used to determine a route (or adjust an existing route), speed, acceleration, vehicle orientation, braking maneuver, or other driving behavior or operation of the vehicle 400.

III. EXAMPLE METHODS AND TIMING DIAGRAMS

Described herein are example methods and processes that could be implemented in LIDAR devices 100 and 200. However, the described methods and processes described could be implemented in LIDAR devices that are configured differently than LIDAR devices 100 and 200.

Figure 5:
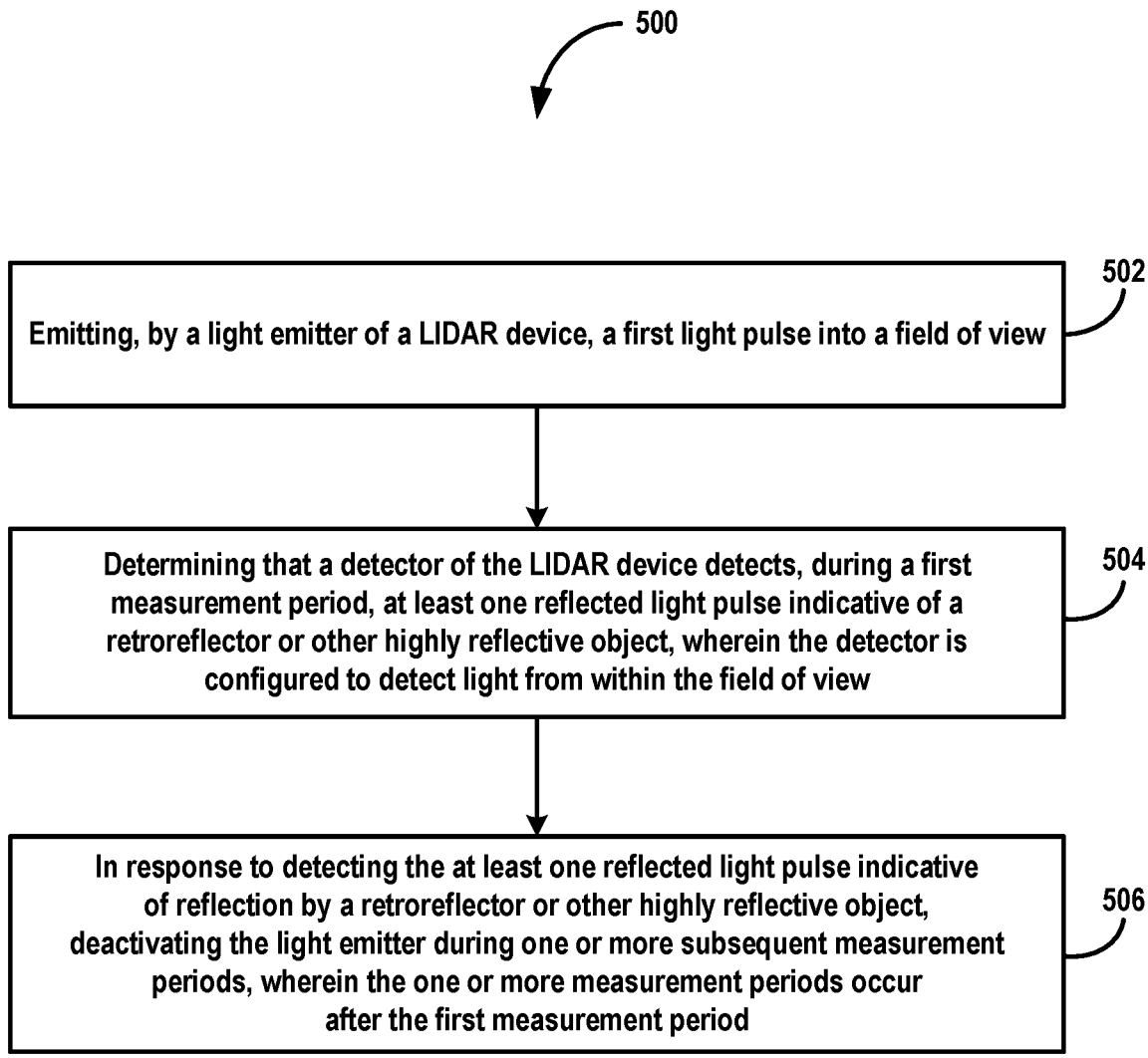
FIG. 5 is a flowchart of a method, according to an example embodiment.

FIG. 5 is a flowchart of a method 500, according to example embodiments. Method 500 presents an embodiment of a method that could be used with any LIDAR device 100 and/or LIDAR device 200, for example. Method 500 may include one or more operations, functions, or actions as illustrated by one or more of blocks 502-506.

In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 500 and other processes and methods disclosed herein, each block in FIG. 5 may represent circuitry that is wired to perform the specific logical functions in the process.

At block 502, method 500 involves emitting, by a light emitter of a LIDAR device, a first light pulse into a field of view. In some examples, the light emitter could be the only light emitter of the LIDAR device. In other examples, the light emitter could be one of a plurality of light emitters of the LIDAR device, with each light emitter being configured to emit light pulses into a respective field of view. In some such examples, the LIDAR device may include one or more primary light emitters (e.g., primary light emitter(s) 102 or primary light emitters 208, 210) and one or more secondary light emitters (e.g., secondary light emitter(s) 104 or secondary light emitter 212). In such examples, the light emitter that emits the first light pulse may be a primary light emitter. The field of view could be any field of view within an environment of the LIDAR device, such as one of the fields of view 240 or 242 shown in FIG. 2 or one of the fields of view 302-322 shown in FIG. 3.

In some embodiments, the LIDAR device may be configured to determine distances to objects in the environment by emitting light pulses and detecting reflected light pulses in sequential measurement periods. In such embodiments, the first light pulse could be emitted by the light emitter during one of the sequential measurement periods.

At block 504, the method 500 involves determining that a detector of the LIDAR device detects, during a first measurement period, at least one reflected light pulse indicative of a retroreflector or other highly reflective object, wherein the detector is configured to detect light from within the field of view. The detector could be any detector that can detect light, such as detector(s) 106 shown in FIG. 1 or detectors 218 and 220 described in FIG. 2.

In some embodiments, the first light pulse is emitted by the light emitter during the first measurement period and the at least one reflected light pulse detected by the detector is a reflection of the first light pulse.

In such embodiments, the reflected light pulse could be indicative of reflection by a retroreflector or other highly reflective object based on a shape of the reflected light pulse. For example, a reflected light pulse from a retroreflector may be so intense that it rapidly saturates the detector. As a result, the detected signal (e.g., ADC values as a function of time) may increase to a large peak value (e.g., a peak value that corresponds to a saturation value of the detector) but then fall off very quickly once the detector is saturated and can no longer detect photons. The resulting pulse has a large peak value but is also unusually narrow. Thus, various features of a detected pulse, such as the peak value of the pulse, the width of the pulse, and/or the steepness of the falling edge of the pulse, may be indicative of reflection by a retroreflector or other highly reflective object.

In some embodiments, the at least one reflected light pulse detected by the detector could be a reflection of a secondary light pulse emitted by a secondary light emitter of the LIDAR device during the first measurement period.

In such embodiments, the LIDAR device may include at least one primary light emitter and at least one secondary light emitter, with the at least one primary light emitter emitting primary light pulses during standard measurement periods and the at least one secondary light emitter emitting secondary light pulses during specialized measurement periods. The light pulses emitted by the at least one secondary light emitter may be spread out over a wider field of view than the light pulses emitted by the at least one primary light emitter and may have a lower intensity. The first measurement period could be a specialized measurement period in which the at least one secondary light emitter emits light to map out the locations of retroreflectors and the at least one primary light emitter does not emit light. Thus, the first light pulse may be emitted by a primary light emitter during a standard measurement period preceding the first measurement period. In such embodiments, the reflected light pulse could be indicative of reflection by a retroreflector or other highly reflective object based on a magnitude of the reflected light pulse exceeding a predetermined threshold. The magnitude of the reflected light pulse could be determined based on the peak value of the reflected light pulse, the integrated area of the reflected light pulse, or based on some other metric.

In some embodiments, the LIDAR device may include a plurality of secondary light emitters. For example, each primary light emitter may be paired with a respective secondary light emitter that has the same or similar field of view (e.g., by placing the paired first and second light emitters in close proximity with each other). In each pair, the primary light emitter may emit a primary light pulse and the secondary light pulse may emit a secondary light pulse at a lower intensity (either before or after the primary light pulse is emitted) to detect reflectors in the field of view.

In some embodiments, the at least one reflected light pulse detected by the detector could be two reflected light pulses detected by the detector: a reflection of the first light pulse emitted by the light emitter and a reflection of a secondary light pulse emitted by a secondary light emitter.

In such embodiments, the LIDAR device may include at least one primary light emitter and at least one secondary light emitter, and both types of light emitters may emit light pulses during each measurement period. Thus, the first light pulse may be emitted by a primary light emitter during the first measurement period, and the secondary light pulse may be emitted by a secondary light emitter during the first measurement period. The first light pulse and the secondary light pulse may be emitted at different times (e.g., the secondary light pulse may be emitted after the first light pulse) and the two light pulses may be separated in time by a predetermined time difference (e.g., 50 nanoseconds). The two light pulses may also have different intensities and beam widths, with the secondary light pulse being spread out over a wider field of view and having a lower intensity than the first light pulse.

The predetermined time difference could be a fixed time difference that is the same for each measurement period. Alternatively, the predetermined time difference could vary from one measurement period to another. In addition, in embodiments in which the LIDAR device includes a plurality of primary light emitters, the predetermined time difference could be the same for all of the primary light emitters. Alternatively, each primary light emitter could have a different, predetermined time difference between when the primary light emitter emits a primary light pulse and when the secondary light pulse is emitted.

The time difference between the first light pulse emitted by the primary light emitter and the secondary light pulse emitted by the secondary light emitter may be used to determine that the reflected light pulses detected by the detector are indicative of reflection by a retroreflector or other highly reflective object. For example, the detector may detect a first reflected light pulse at a first time and a second reflected light pulse at a second time. The determination that these two reflected light pulses detected by the detector are indicative of reflection by a retroreflector or other highly reflective object may be based on a determination that the time difference between the first and second times corresponds to the predetermined time difference between when the first light pulse is emitted by the primary light emitter and the secondary light pulse is emitted by the secondary light emitter.

The determination that the reflected light pulses detected by the detector are indicative of reflection by a retroreflector or other highly reflective object could also be based on multiple shots. For example, the timing between emitted light pulses could be varied to resolve ambiguities when detecting retroreflectors.

The determination that the first and second reflected light pulses detected by the detector are indicative of reflection by a retroreflector or other highly reflective object may also take into account other features of the first and second reflected light pulses. In some implementations, the determination may involve checking whether the peak values of the first and second reflected pulses are consistent with the first light pulse emitted by the primary light emitter and the secondary light pulse emitted by the secondary light emitter. For example, if the first light pulse is emitted before the secondary light pulse, then the first reflected light pulse that is detected should have a higher peak value than the second reflected light pulse that is detected. In some implementations, the determination may involve a determination of whether one of the reflected light pulses has a shape indicative of reflection by a retroreflector (e.g., a high peak value in combination with a narrow pulse width and a steep falling edge). In some implementations, the determination may involve a determination that the first reflected light pulse and/or second reflected light pulse have magnitudes that exceed predetermined threshold values. For example, the peak value of the first reflected light pulse could be compared to a first threshold indicative of reflection of the first light pulse by a retroreflector and/or the peak value of the second reflected light pulse could be compared to a second, different threshold indicative of reflection of the secondary light pulse by a retroreflector.

In a variation of this approach, a primary light emitter could emit both the first light pulse and the secondary light pulse (at a lower intensity), separated in time by the predetermined period of time. Thus, the intensity of the light pulses emitted by the primary light pulse could be controlled instead of using a separate secondary light emitter.

At block 506, the method 500 involves deactivating the light emitter during or more subsequent measurement periods in response to detecting the at least one reflected light pulse indicative of reflection by a retroreflector or other highly reflective object. The one or more subsequent measurement periods occur after the first measurement period. In some embodiments, deactivating the light emitter during the one or more subsequent measurement periods involves controlling the light emitter such that the light emitter does not emit light during the one or more subsequent measurement periods (e.g., does not illuminate the retroreflector). Alternatively, deactivating the light emitter during the one or more subsequent measurement periods could involve controlling the light emitter such that the light emitter emits light at a reduced level (e.g., light pulses with a reduced pulse energy and/or intensity) during the one or more subsequent measurement periods. Advantageously, even though the light emitter may still emit some light toward the retroreflector, the reduced level of light emission can be sufficiently low that cross-talk is greatly reduced or eliminated.

In some embodiments, the method 500 further involves determining when to reactivate the deactivated light emitter. Further, determining when to reactivate the deactivated light emitter may involve determining whether the light emitter's corresponding detector detects, during the one or more subsequent measurement periods, one or more additional reflected light pulses indicative of reflection by a retroreflector or other highly reflective object. In this regard, even though the light emitter is deactivated during the one or more subsequent measurement periods, the light emitter's corresponding detector may still detect a reflected light pulse for at least two possible reasons.

First, in embodiments in which the LIDAR device includes a plurality of primary light emitters (including the deactivated light emitter), stray light from one or more of the other primary light emitters may enter the deactivated light emitter's field of view and reach the retroreflector. Thus, the detector, which is configured to detect light from within the deactivated light emitter's field of view, may detect a reflected light pulse that corresponds to stray light from one or more other primary light emitters being reflected by the retroreflector or other highly reflective object.

Second, in embodiments in which the LIDAR device includes a secondary light emitter, the secondary light emitter may continue to emit light pulses into a wide field of view that includes the deactivated light emitter's field of view. Thus, the detector may detect a reflected light pulse that corresponds to light from the secondary light emitter being reflected by the retroreflector or other highly reflective object.

Therefore, either as a result of stray light being reflected by the retroreflector and/or as a result of light from a secondary light emitter being reflected by the retroreflector, the detector may detect one or more additional reflected light pulses during a second measurement period that occurs after the first measurement period. The second measurement period may occur either immediately following the first measurement period or may occur some number of measurement periods after the first measurement period. The one or more additional reflected light pulses may be analyzed to determine whether the additional reflected light pulse is indicative of reflection by a retroreflector.

In some embodiments, the analysis may involve comparing a magnitude of an additional reflected light pulse (e.g., a peak value or integrated area of the additional reflected light pulse) to a threshold. If the magnitude exceeds the threshold, then the additional reflected light pulse may be considered the result of reflection by a retroreflector or other highly reflective object in the field of view of the deactivated light emitter. If the magnitude does not exceed the threshold, then the additional reflected light pulse may be considered to be the result of noise or stray light that has not been reflected by a retroreflector or other highly reflective object, thereby indicating the that the retroreflector or other highly reflective object is no longer in the field of view of the deactivated light emitter.

In some embodiments (e.g., in embodiments in which the primary and secondary light emitters emit light pulses that are separated in time by a predetermined time difference), the analysis may involve a determination of whether two additional reflected light pulses are detected with a time difference that corresponds to the predetermined time difference). For example, one of the reflected light pulses may result from stray light from light pulses emitted by one or more other primary light emitters being reflected by a retroreflector and the other reflected light pulse may result from light emitted by the secondary light emitter being reflected by the retroreflector or other highly reflective object. If two additional reflected light pulses are detected with a time difference that corresponds to the predetermined time difference, then the additional reflected light pulses may be considered the result of reflection by a retroreflector or other highly reflective object in the deactivated light emitter's field of view. The lack of such additional reflected light pulses being detected may indicate that the retroreflector or other highly reflective object is no longer in the deactivated light emitter's field of view.

If the analysis indicates that the one or more additional reflected light pulses detected by the detector during the second measurement period are indicative of reflection by a retroreflector or other highly reflective object, then the light emitter may continue to be deactivated for one or more additional measurement periods. However, if the analysis indicates that the additional reflected light pulse is not indicative of reflection by a retroreflector or other highly reflective object, the light emitter may be reactivated such that the light emitter emits a second light pulse in a third measurement period that occurs after the second measurement period.

Figure 6A:
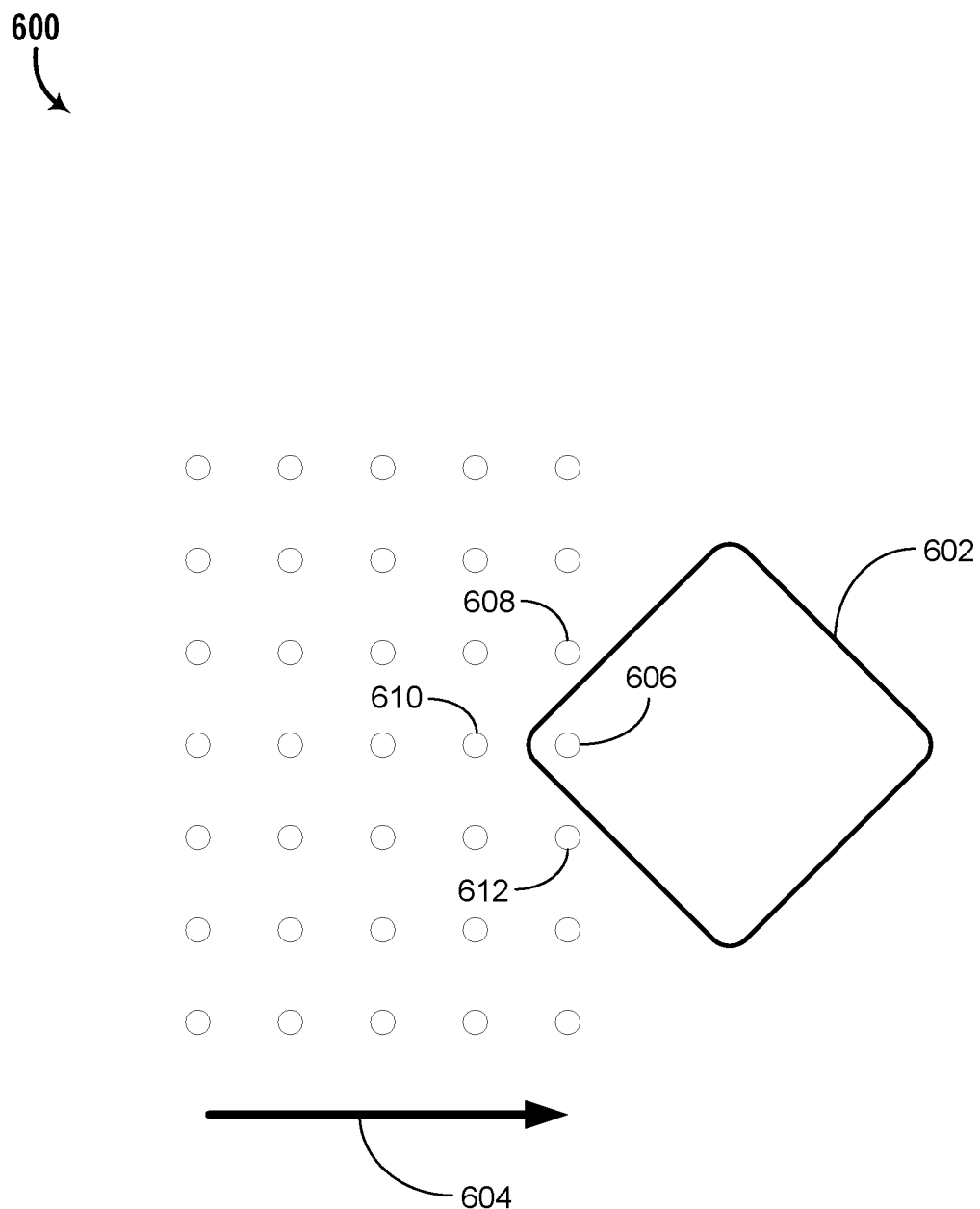
FIGS. 6A-6C illustrate a scenario in which a LIDAR device scans a portion of its environment where a retroreflector is located, according to an example embodiment.
Figure 6B:
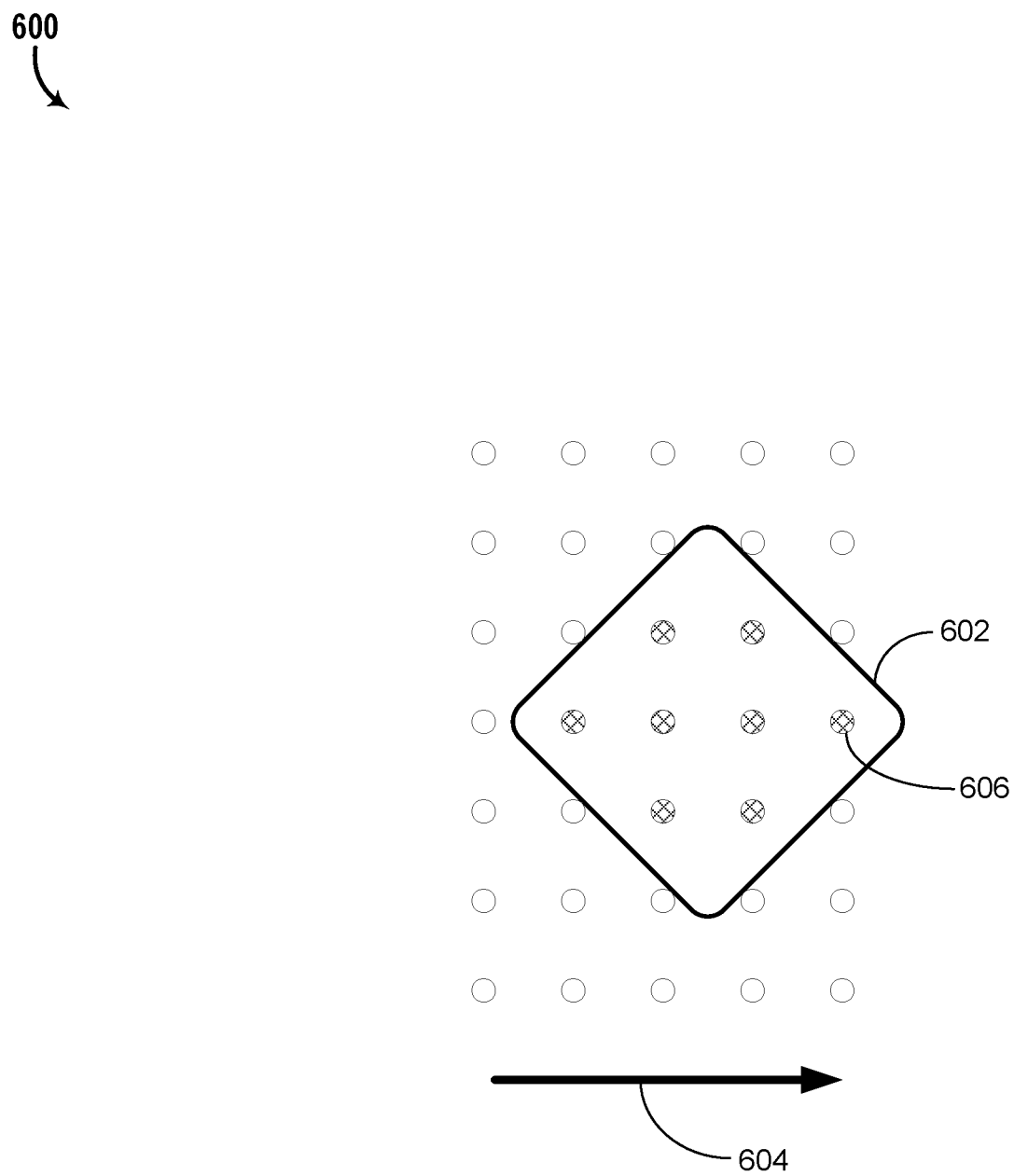
Figure 6C:
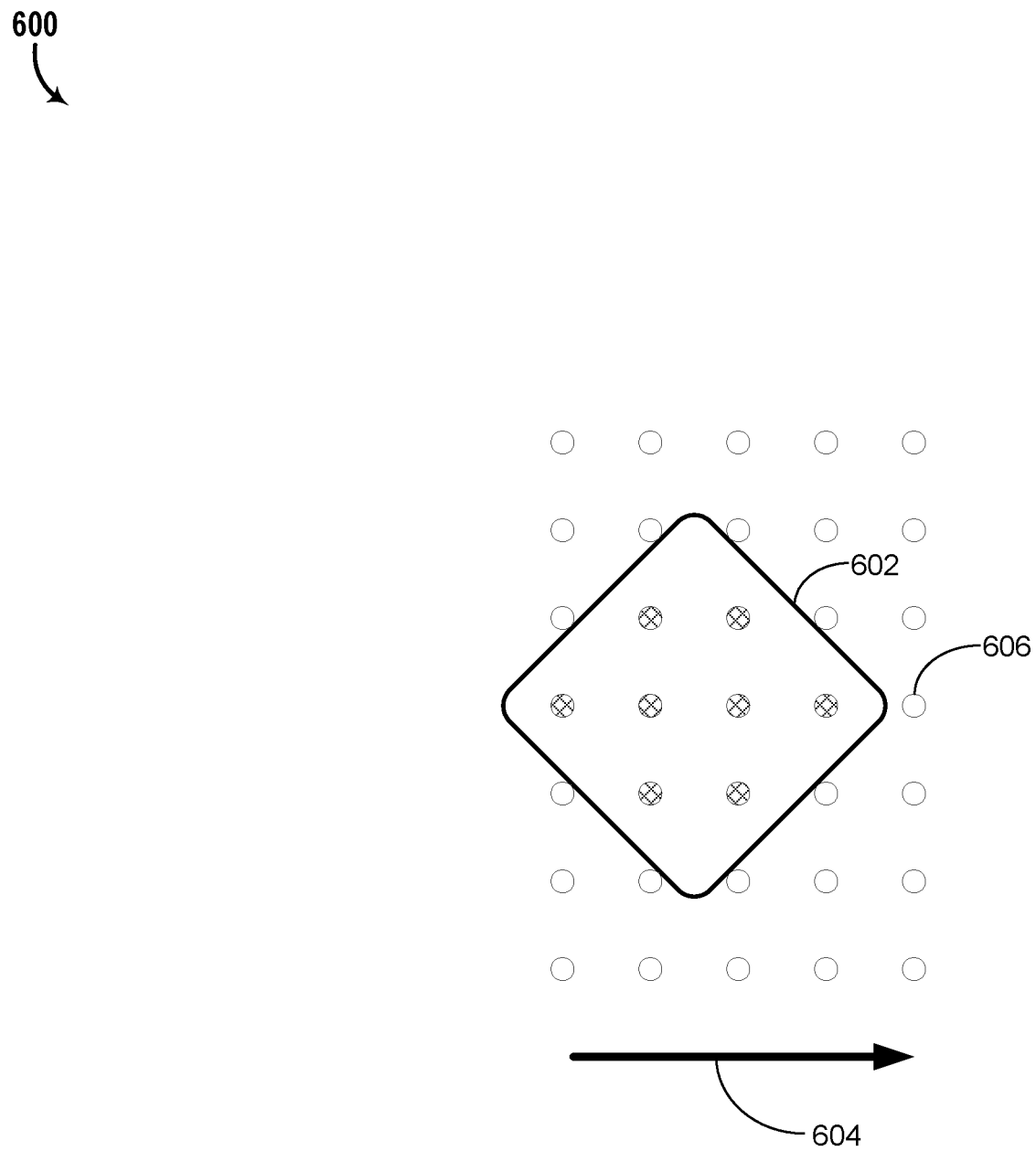

FIGS. 6A-6C illustrate an example scenario 600 in which a LIDAR device scans a portion of its environment. The LIDAR device includes a plurality of transmit/receive channels with fields of view that span a range of elevational angles and a range of azimuthal angle. For purposes of illustration, FIGS. 6A-6C show the fields of view of the transmit/receive channels as a grid pattern that includes five different azimuthal angles and seven different elevational angles. The field of view of each individual transmit/receive channel is indicated by a circle. In practice, however, the field of view a transmit/receive channel could take on some other shape. In addition, while FIGS. 6A-6C show the fields of view in a grid pattern, it is to be understood that the fields of view of the transmit/receive channels could be arranged differently. In scenario 600, any of the aforementioned techniques may be used to determine when to deactivate a light emitter due to a retroreflector being present in the light emitter's field of view and when to reactivate the light emitter due to the retroreflector no longer being present in the light emitter's field of view.

As shown in FIG. 6A, the grid pattern of the channels' fields of view is moving toward a retroreflector 602 in a direction 604, as may occur when the LIDAR device scans through a portion of its environment. The retroreflector 602 could be, for example, a road sign (e.g., a pedestrian crossing sign), a retroreflective marker on a vehicle, or some other type of retroreflector. The direction 604 may be a horizontal direction (e.g., parallel to the ground or road surface) based on, for example, the LIDAR device rotating about a vertical axis.

At the point in time illustrated in FIG. 6A, a portion of the retroreflector 602 has just moved into the field of view of channel 606 but is not yet in the field of view of any other channel. The light emitter of channel 606 emits a light pulse toward the retroreflector 602, which generates a strong reflected light pulse that is detected by the detector of channel 606. In addition, one or more neighboring channels, such as channels 608, 610, and/or 612 may detect a weak reflected light pulse that results from stray light from the strong reflected light pulse entering those channels' fields of view. Those weak reflected light pulses, if used for distance determinations, may result in inaccuracies. Thus, it is desirable to detect the presence of the retroreflector 602 and to control the light emitted in the various transmit/receive channels to avoid illuminating the retroreflector 602.

In scenario 600, any of the techniques described herein (e.g., either with or without the aid of a secondary light emitter) may be used to determine that the strong reflected light pulse detected by the detector in channel 606 is indicative of reflection by a retroreflector in the field of view of 606. In response to this determination, the light emitter in channel 606 is deactivated.

FIG. 6B illustrates a later point in time when the retroreflector 602 is in the field of view of channel 606 and is also in the fields of view of seven other channels. The presence of the retroreflector 602 in the fields of view of those channels may be detected using any of the techniques described herein and the light emitters in those channels responsively deactivated. In FIG. 6B, the channels with deactivated light emitters are indicated by hatching.

FIG. 6C illustrates a still later point in time when the retroreflector 602 is no longer in the field of view of channel 606. The light emitter in channel 606 has been reactivated, as indicated by channel 606 being shown with no hatching. In scenario 600, the reactivation of the light emitter in channel 606 is made in response to a determination that the retroreflector 602 is no longer in the field of view of channel 606. That determination could be made using any of the techniques described herein. The retroreflector 602 is in the field of view of other channels, however. The light emitters in those channels have been deactivated, as indicated by hatching.

FIGS. 7A-7D are timing diagrams that illustrate a scenario 700 in which a retroreflector is detected in the field of view of a light emitter of a LIDAR device, responsively deactivated, and subsequently reactivated when the retroreflector is no longer in the light emitter's field of view. In scenario 700, the LIDAR device includes a plurality of transmit/receive channels, each with a respective field of view into which a respective light emitter emits light pulses and from which a corresponding detector is configured to detect light. For purposes of illustration, three transmit/receive channels (CH1, CH2, and CH3) are described in scenario 700. Further, scenario 700 is an example in which a retroreflector is detected without the use of a flood illuminator, flash illuminator or other type of secondary light emitter.

Figure 7A:
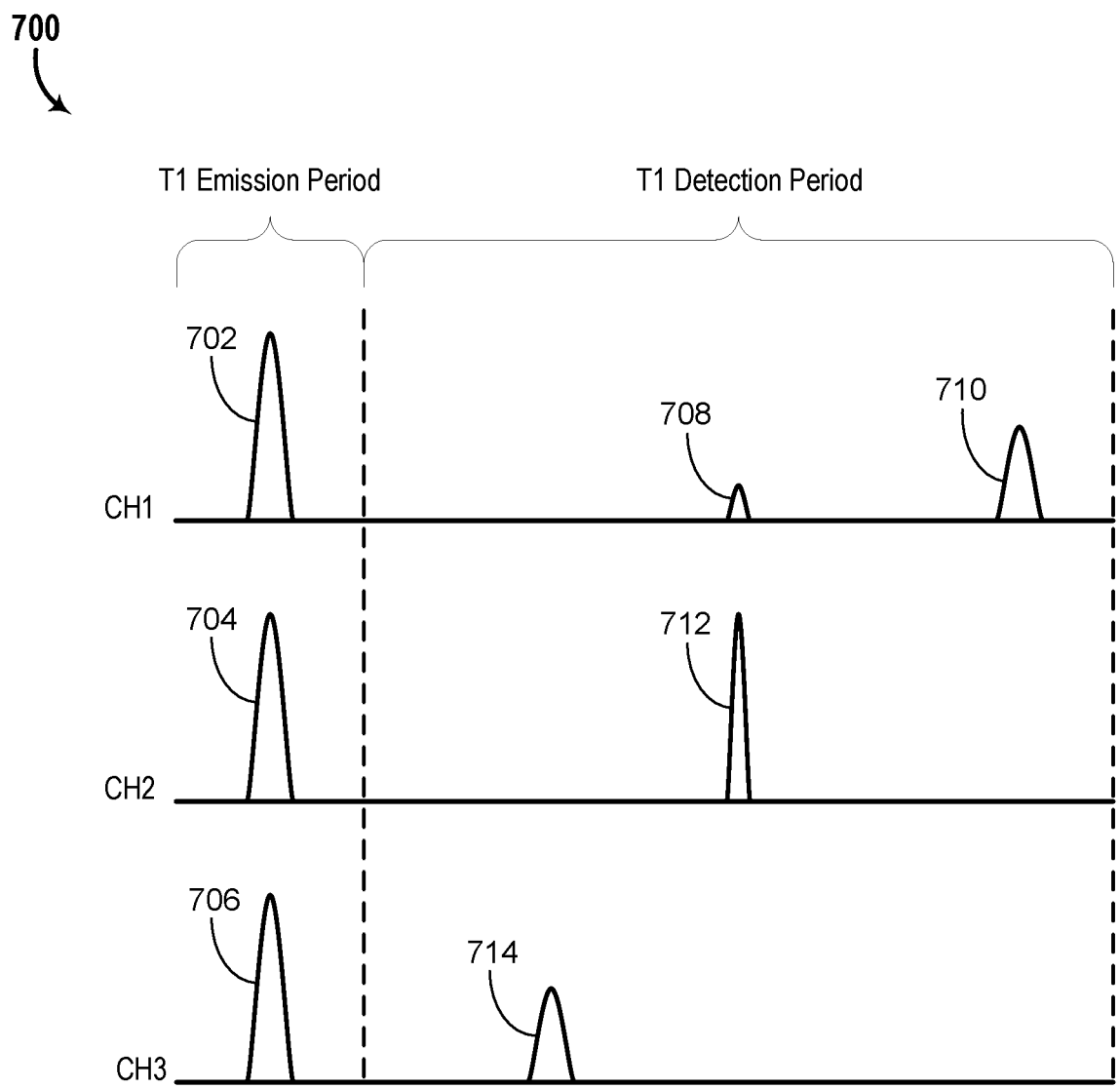
FIGS. 7A-7D are timing diagrams that illustrate a scenario in which a retroreflector is detected in the field of view of a light emitter of a LIDAR device, responsively deactivated, and subsequently reactivated when the retroreflector is no longer in the light emitter's field of view, according to an example embodiment.

FIG. 7A illustrates a measurement period T1 that includes an emission period followed by a detection period. The light emitters in CH1, CH2, and CH3 emit light pulses 702, 704, and 706 during the emission period. In this scenario, the light pulses 702-706 are emitted simultaneously or nearly simultaneously. Alternatively, the light pulses 702-706 could be emitted at different times within the emission period.

The detector in CH1 detects reflected light pulses 708 and 710. The detector in CH2 detects a reflected light pulse 712. The detector in CH3 detects a reflected light pulse 714. The shapes of the reflected light pulses 708-714 are analyzed to determine whether any of these reflected light pulses are indicative of reflection by a retroreflector. In this example, reflected light pulse 712 is indicative of reflection by a retroreflector based on its shape, specifically based on the reflected light pulse being narrow and having a large peak value. Thus, the shape of the reflected light pulse 712 indicates that a retroreflector is in the field of view of CH2.

The shapes of the other reflected pulses are not indicative of reflection by a retroreflector and, thus, may be used to determine distances to objects. However, because reflected light pulse 708 is a weak pulse that is detected at the same time as the retroreflected light pulse 712, it may be ambiguous as to whether the reflected light pulse 708 actually represents reflection by an object in the field of view of CH1 or whether the reflected light pulse 708 represents stray light from the retroreflector that is actually in the field of view of CH2 rather than CH1.

Figure 7B:
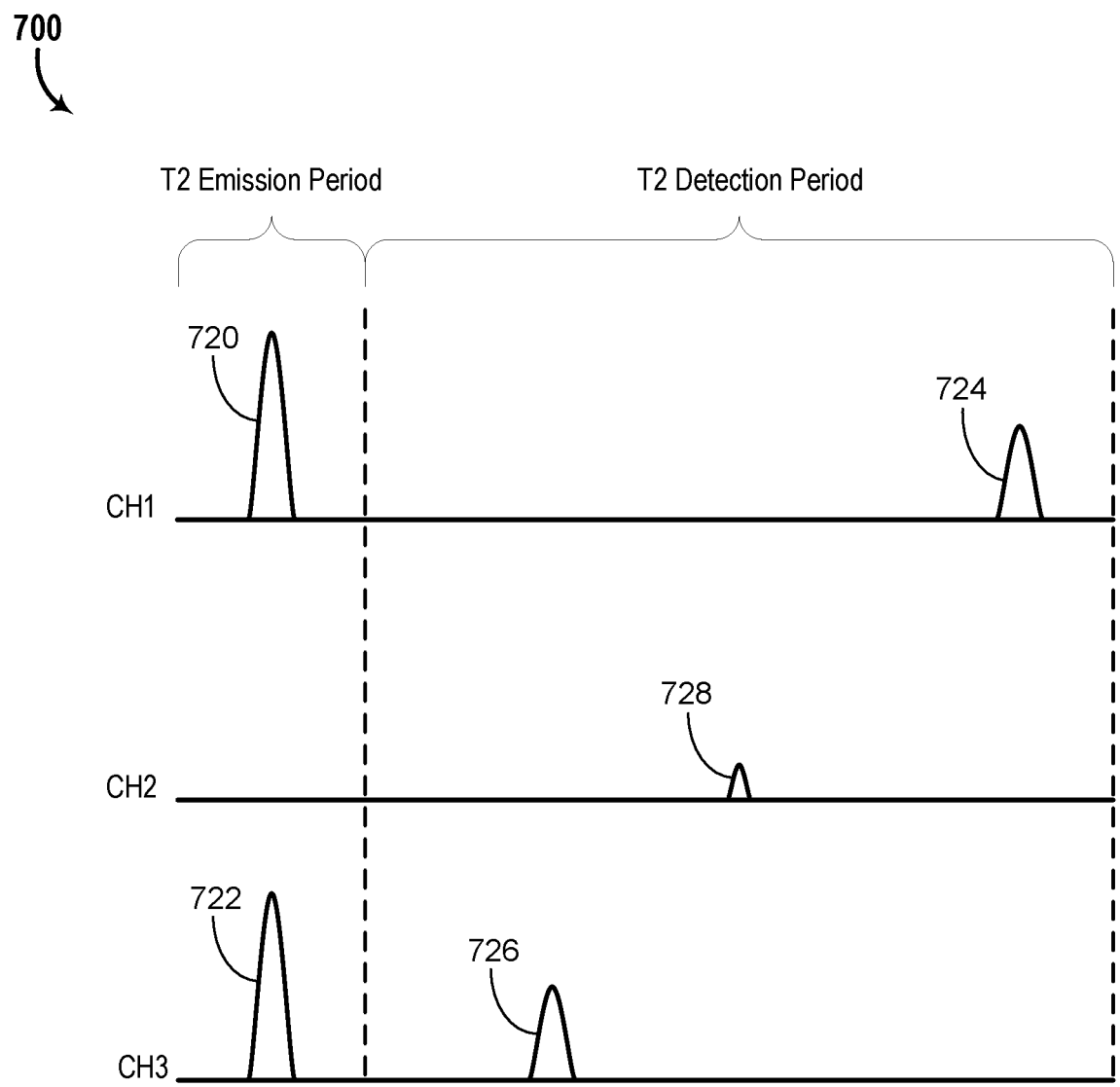

Based on the shape of the reflected light pulse 712 indicating a retroreflector in the field of view of CH2, the light emitter of CH2 is deactivated for one or more subsequent measurement periods. For example, FIG. 7B illustrates a subsequent measurement period T2. As shown, the light emitters in CH1 and CH3 emit light pulses 720 and 722, but the light emitter in CH2 does not emit light. The detector in CH1 detects a reflected light pulse 724 (which may be similar to reflected light pulse 710), and the detector in CH3 detects a reflected light pulse 726 (which may similar to reflected light pulse 714). Even though the light emitter in CH2 does not emit light, the detector in CH2 detects a reflected light pulse 728 (e.g., a magnitude of the reflected light pulse 728 exceeds a threshold). The detection of the reflected light pulse 728 indicates that the retroreflector is still within the field of view of CH2. Specifically, the reflected light pulse 728 appears because stray light from CH1 and/or CH3 reaches the retroreflector and is reflected into the field of view of CH2.

FIG. 7B also shows that the detector CH1 no longer detects a reflected light pulse like the ambiguous reflected light pulse 708. Thus, in this example, deactivating the light emitter in CH2 such that the light emitter does not illuminate the retroreflector is effective in preventing CH1 from detecting a spurious reflected light pulse.

Based on the detector of CH2 detecting a reflected light pulse when the light emitter of CH2 is deactivated, which indicates that the retroreflector is still within the field of view of the retroreflector, the light emitter of CH2 may remain deactivated for one or more subsequent measurement periods. At some point, however, the retroreflector may no longer be within the field of view of CH2 (e.g., because the LIDAR device has scanned past it). In scenario 700, this occurs during a measurement period T3, as illustrated in FIG. 7C.

Figure 7C:
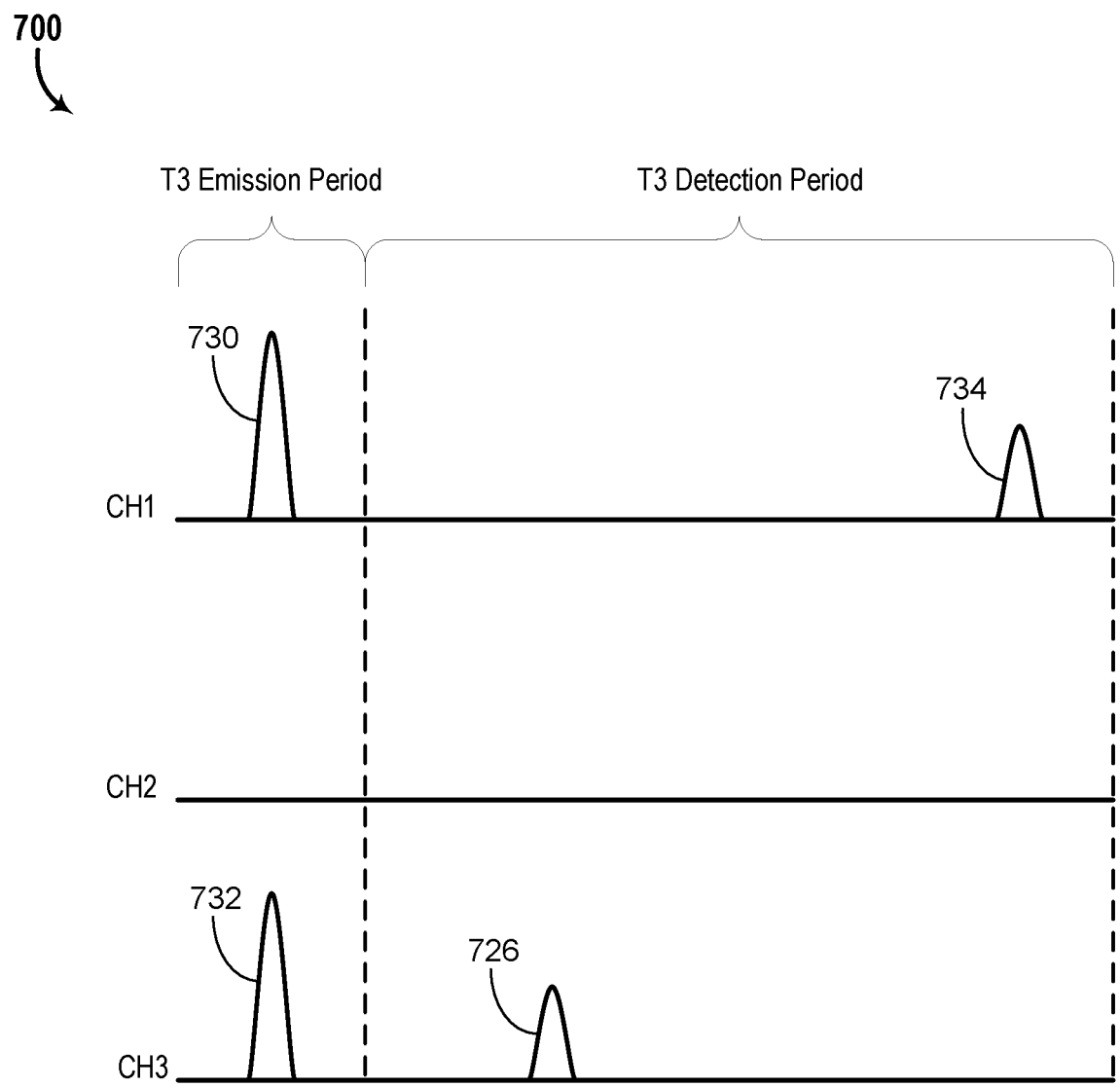

As shown in FIG. 7C, the light emitter in CH1 emits a light pulse 730, the light emitter in CH3 emits a light pulse 732, but the emitter in CH2 does not emit light. The detector in CH1 detects a reflected light pulse 734 (which may be similar to the reflected light pulse 724), and the detector in CH3 detects a reflected light pulse 736 (which may be similar to the reflected light pulse 726). However, the detector in CH2 does not detect a reflected light pulse (e.g., does not detect a reflected light pulse that exceeds a threshold). This indicates that the retroreflector is no longer in the field of view of CH2.

Figure 7D:
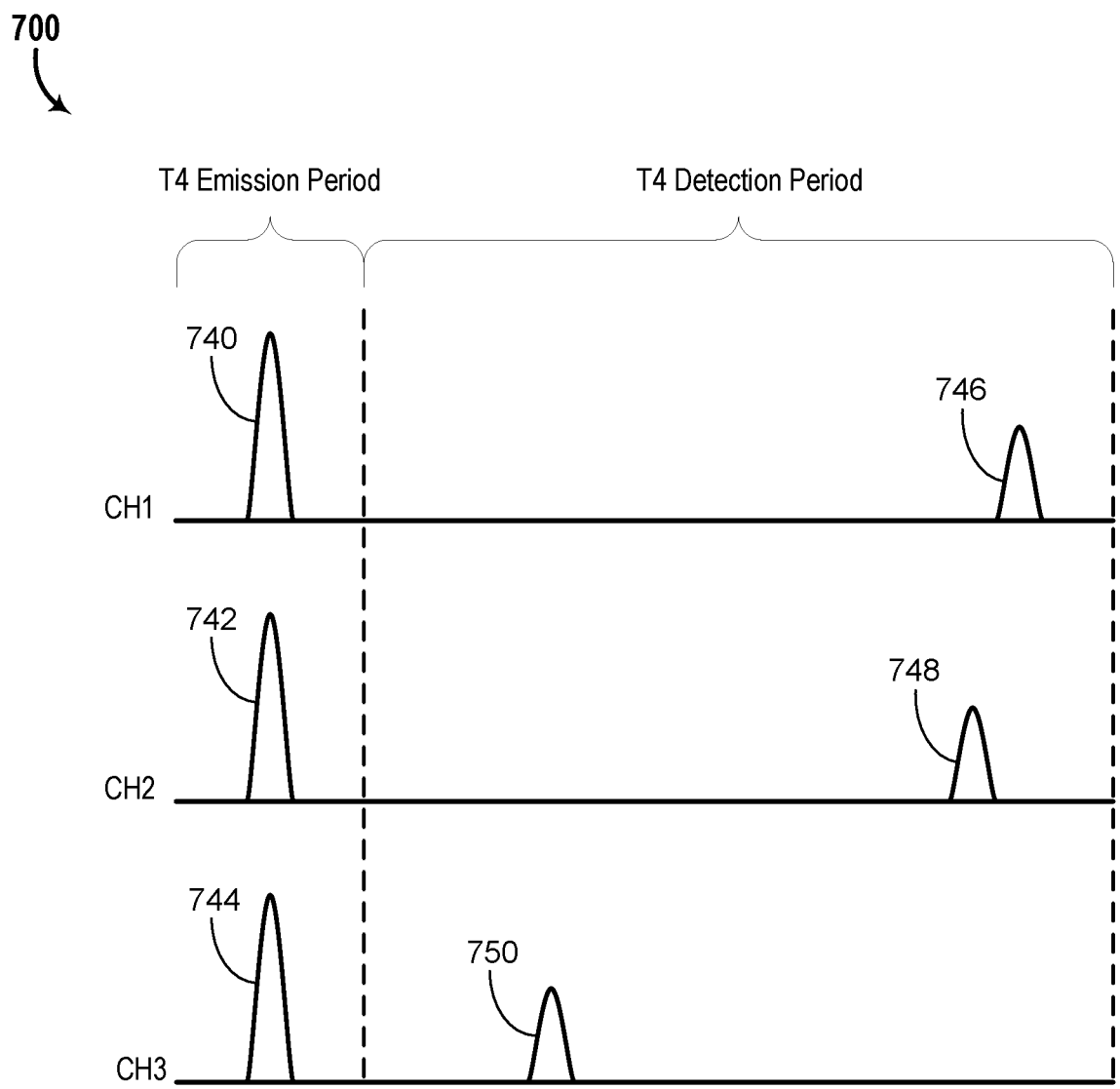

Based on the detector in CH2 not detecting a reflected light pulse during measurement period T3, the light emitter of CH2 is reactivated to emit light during one or more subsequent measurement periods. FIG. 7D illustrates a subsequent measurement period T4. As shown, the light emitters in CH1, CH2, and CH3 emit light pulses 740, 742, and 744, respectively, and the detectors in CH1, CH2, and CH3 detect reflected light pulses 746, 748, and 750. In this case, the reflected light pulses 746, 748, and 750 are not indicative of reflection by a retroreflector and, thus, may be used for determining distances to objects.

FIGS. 8A-8D are timing diagrams that illustrate a scenario 800 in which a retroreflector is detected in the field of view of a light emitter of a LIDAR device, responsively deactivated, and subsequently reactivated when the retroreflector is no longer in the light emitter's field of view. Scenario 800 is similar to scenario 700 except that a secondary light emitter is used. Thus, in scenario 800, the LIDAR device includes a plurality of transmit/receive channels, each with a respective field of view into which a respective primary light emitter emits light primary pulses and from which a corresponding detector is configured to detect light. For purposes of illustration, three transmit/receive channels (CH1, CH2, and CH3) are described. In scenario 800, a secondary light emitter also emits secondary light pulses into a wide field of view that encompasses the fields of view of the transmit/receive channels. The secondary light pulses have a much lower intensity than the primary light pulses. As a result, reflections of the secondary light pulses are not expected to be detected as reflected light pulses (e.g., detected above a threshold) unless they are reflected by a retroreflector.

Figure 8A:
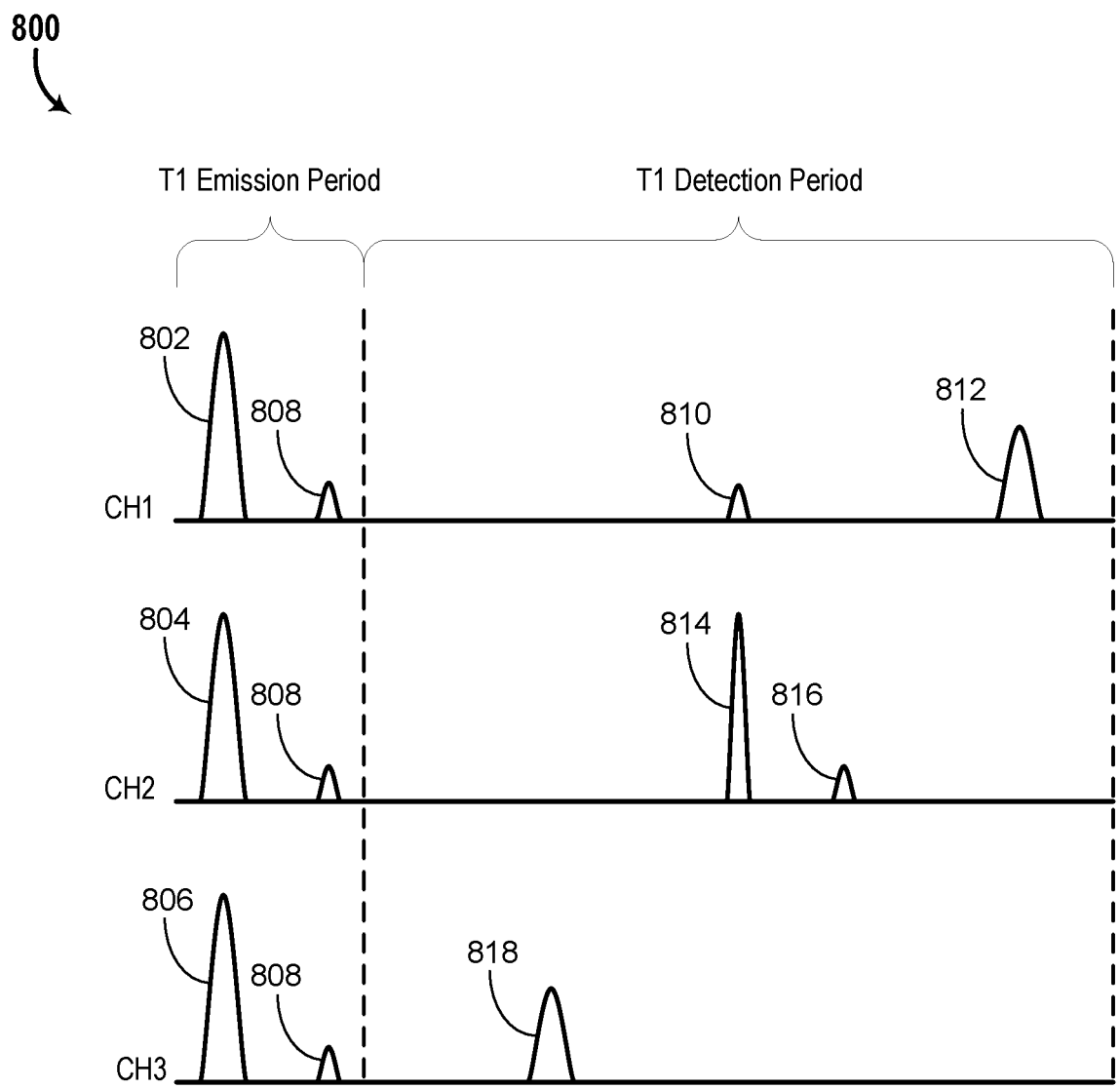
FIGS. 8A-8D are timing diagrams that illustrate a scenario in which a retroreflector is detected in the field of view of a primary light emitter of a LIDAR device, responsively deactivated, and subsequently reactivated when the retroreflector is no longer in the primary light emitter's field of view, according to an example embodiment.

FIG. 8A illustrates a measurement period T1 that includes an emission period followed by a detection period. The primary light emitters in CH1, CH2, and CH3 emit primary light pulses 802, 804, and 806, respectively, during the emission period. The secondary light emitter emits a secondary light pulse 808 during the emission period. Because the secondary light pulse 808 illuminates the fields of view of each of the channels, the secondary light pulse 808 is shown in CH1, CH2, and CH3. In this example, the primary light pulses 802-806 are emitted simultaneously or nearly simultaneously and the secondary light pulse 808 is emitted a predetermined period of time (e.g., 50 nanoseconds) after the primary light pulses 802-806 are emitted. Alternatively, the secondary light pulse 808 could be emitted before the primary light pulses 802-806 are emitted or at the same time the primary light pulses 802-806 are emitted.

The detector in CH1 detects reflected light pulses 810 and 812. The detector in CH2 detects reflected light pulse 814 and 816. The detector in CH3 detects a reflected light pulse 818. The reflected light pulses 810-818 are then analyzed to determine whether any of the reflected light pulses are indicative of reflection by a retroreflector. The analysis can involve a determination whether two reflected light pulses appear in the same channel with a time separation that corresponds to the predetermined period of time between the emissions of the primary light pulses 802-806 and the secondary light pulse 808. In this case, the reflected light pulses 814 and 816 in CH2 have such a time separation. Thus, the reflected light pulses 814 and 816 are indicative of reflection by a retroreflector in the field of view of CH2. The analysis can also take into account other factors such as the shape of the reflected light pulses. In this case, the reflected light pulse 814 has a large peak value and a narrow width, which further indicates reflection by a retroreflector in the field of view of CH2.

The other reflected light pulse 810, 812, and 818 may be used to determine distances to objects. However, because reflected light pulse 810 is a weak pulse that is detected at the same time that the retroreflected light pulse 814 is detected, the reflected light pulse 810 may be cross-talk due to the retroreflector in the field of view of CH2 rather than reflection by an object in the field of view of CH1.

Figure 8B:
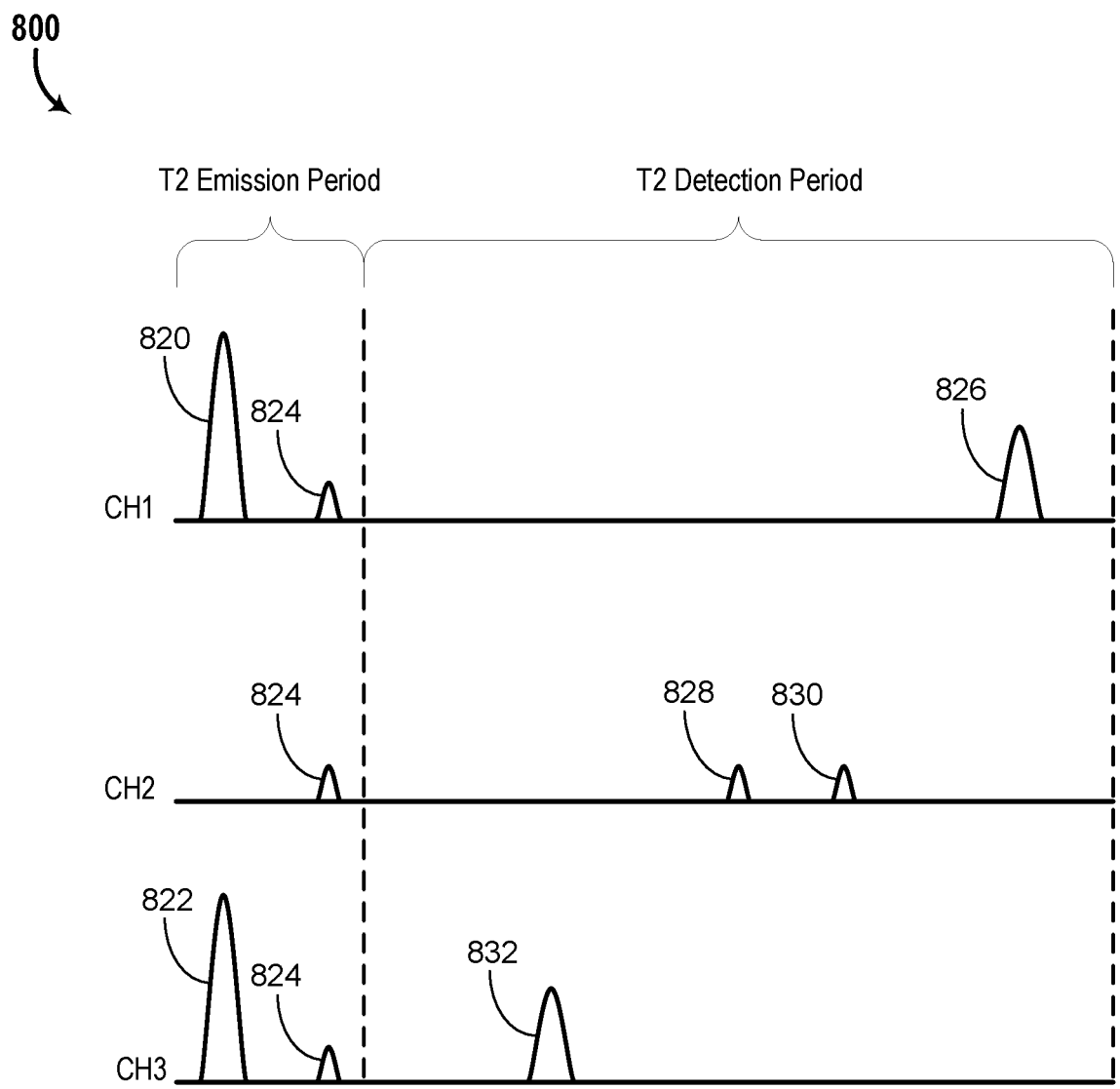

Based on the determination that the reflected light pulses 814 and 816 are indicative of reflection by a retroreflector in the field of view of CH2, the primary light emitter of CH2 is deactivated for one or more subsequent measurement periods. For example, FIG. 8B illustrates a subsequent measurement period T2. During the emission period, the primary light emitters in CH1 and CH3 emit primary light pulses 820 and 822, but the primary light emitter in CH2 does not emit light. During the emission period, the secondary light emitter emits a secondary light pulse 824 into a wide field of view that encompasses the fields of view of CH1, CH2, and CH3. During the detection period, the detector in CH1 detects a reflected light pulse 824 (which may be similar to reflected light pulse 812), the detector in CH2 detects weak reflected light pulses 828 and 830, and the detector in CH3 detects a reflected light pulse 832 (which may be similar to reflected light pulse 818).

The reflected light pulses 826-832 are analyzed to determine whether reflection by a retroreflector is indicated. As before, the analysis can involve a determination whether two reflected light pulses appear in the same channel with a time separation that corresponds to the predetermined period of time between the emissions of the primary light pulses 820, 822 and the secondary light pulse 824. In this case, the reflected light pulses 828 and 830 in CH2 have such a time separation. The analysis can also take into account other considerations, such as whether one or both pulses has a magnitude that exceeds a threshold.

Thus, in this example, the reflected light pulses 828 and 830 are indicative of reflection by a retroreflector within the field of view of CH2. The reflected light pulse 828 may be attributed to stray light from the primary light pulses emitted in other channels being reflected by the retroreflector into the field of view of CH2. The reflected light pulse 830 may be attributed to reflection of the secondary light pulse 824 by the retroreflector.

Based on the determination that the reflector is still within the field of view of CH2, the primary light emitter of CH2 may remain deactivated for one or more subsequent measurement periods. At some point, however, the retroreflector may no longer be within the field of view of CH2 (e.g., because the LIDAR device has scanned past it). In scenario 800, this occurs during a measurement period T3, as illustrated in FIG. 8C.

Figure 8C:
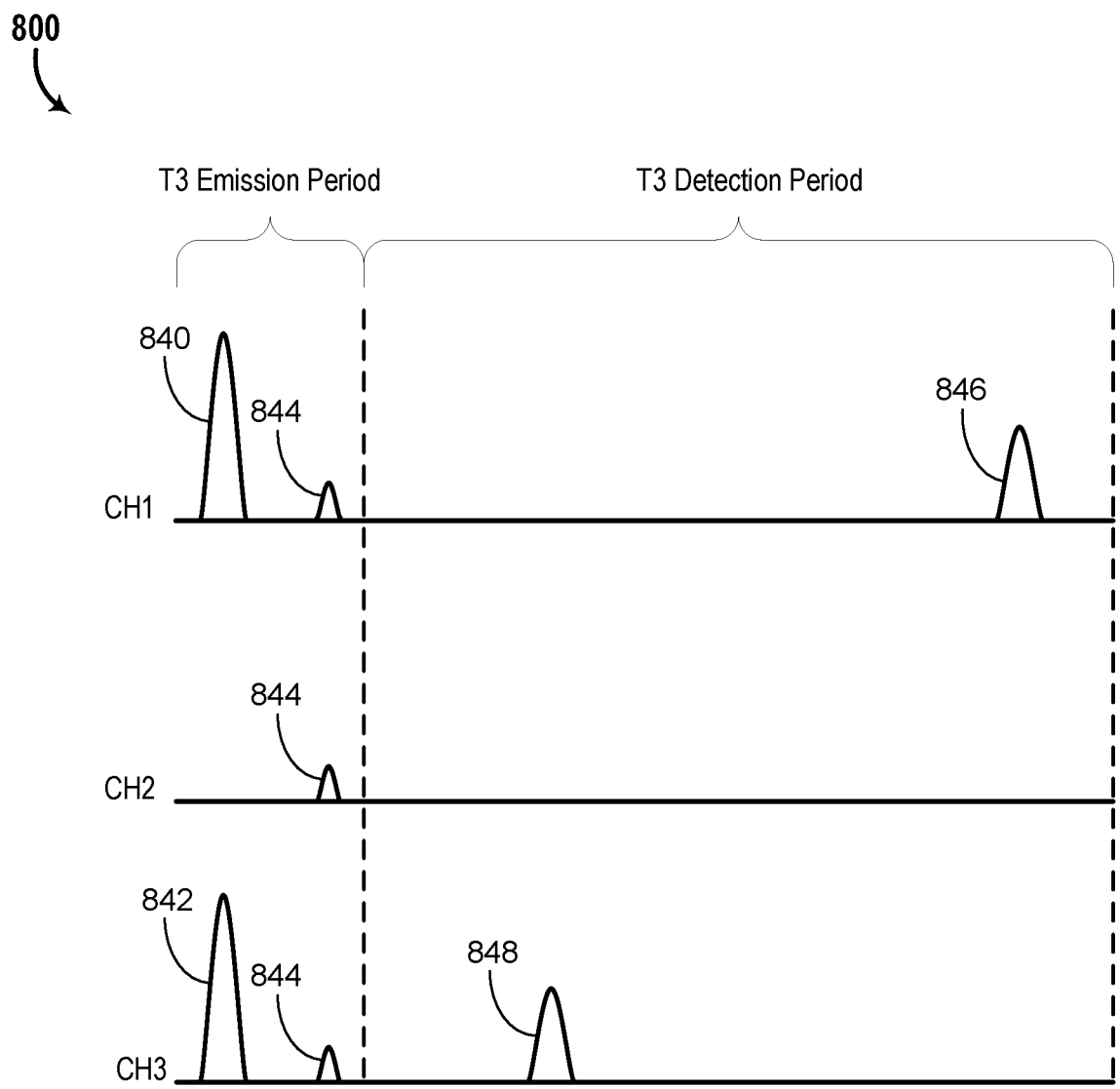

As shown in FIG. 8C, the primary light emitter in CH1 emits a primary light pulse 740, the primary light emitter in CH3 emits a primary light pulse 842, but the primary emitter in CH2 does not emit light. The secondary light emitter emits a secondary light pulse 844 into a wide field of view that encompasses the fields of view of CH1, CH2, and CH3. During the detection period, the detector in CH1 detects a reflected light pulse 846 (which may be similar to the reflected light pulse 826), and the detector in CH3 detects a reflected light pulse 848 (which may be similar to the reflected light pulse 848). However, the detector in CH2 does not detect a reflected light pulse (e.g., does not detect a reflected light pulse that exceeds a threshold). This indicates that the retroreflector is no longer in the field of view of CH2.

Figure 8D:
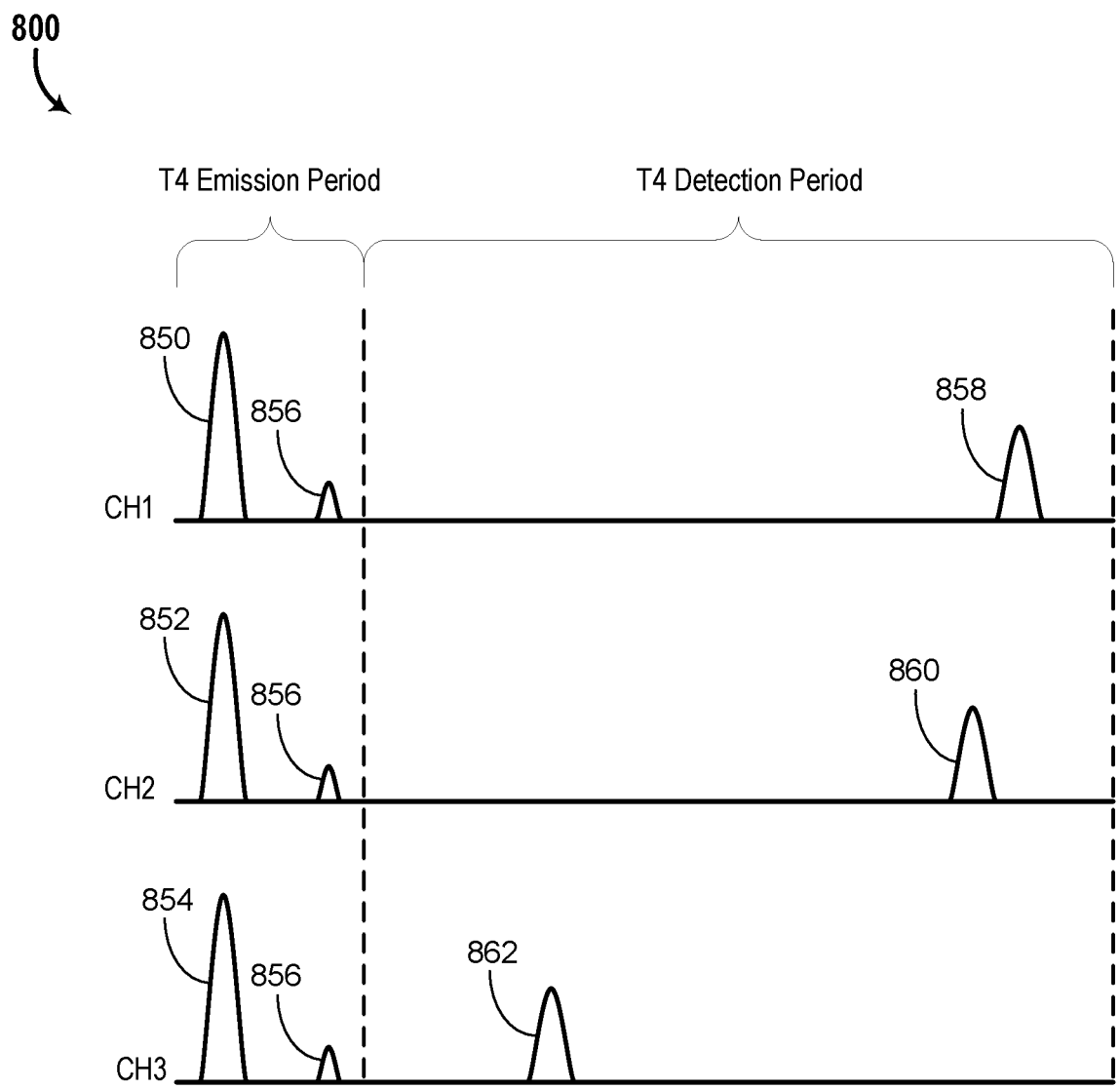

Based on the detector in CH2 not detecting a reflected light pulse during measurement period T3, the light emitter of CH2 is reactivated to emit light during one or more subsequent measurement periods. FIG. 8D illustrates a subsequent measurement period T4. As shown, the primary light emitters in CH1, CH2, and CH3 emit primary light pulses 850, 852, and 854, respectively, and the secondary light emitters emits a secondary light pulse 856. The detectors in CH1, CH2, and CH3 detect reflected light pulses 858, 860, and 862. In this case, the reflected light pulses 858, 860, and 862 are not indicative of reflection by a retroreflector and, thus, may be used for determining distances to objects.

In scenario 800 described above, the secondary light emitter emits a secondary light pulse in each measurement period in order to detect retroreflectors. In other implementations, however, the secondary light emitter may emit a secondary light pulse in only certain measurement periods. For example, the secondary light emitter may emit secondary light pulses only during specialized measurement periods in which the primary light emitters do not emit light. The specialized measurement periods may be interleaved with standard measurement periods in which the primary light emitters emit primary light pulses. For example, the specialized measurement periods may occur every five measurement periods, every ten measurement periods, every twenty measurement periods, or with some other frequency. Alternatively, the specialized measurement periods may be designated dynamically, for example, in response to sensor data or other information that suggests that a retroreflector may be scanned by the LIDAR device. In yet another approach, the specialized measurement period could be a background measurement period that is used to determine a background level of ambient light. For example, a background measurement period may occur before the emission period of each measurement period, so that the background level that is determined during the background measurement period may be used to set a detection threshold used during the subsequent measurement period. Thus, in addition to measuring the background level of ambient light, a background measurement period may be used to detect reflections of the secondary light pulse, which may be indicative of reflection by a retroreflector or other highly reflective object.

A specialized measurement period may be used to determine when a retroreflector is within a channel's field of view, so that the primary light emitter in that channel can be responsively deactivated. A specialized measurement period may also be used to determine when a retroreflector is no longer within a channel's field of view, so that the primary light emitter in that channel can be responsively reactivated. FIGS. 9A-9D are timing diagrams that illustrate a scenario 900 in which specialized measurement periods are used to determine when to deactivate and when to reactivate a primary light emitter.

Figure 9A:
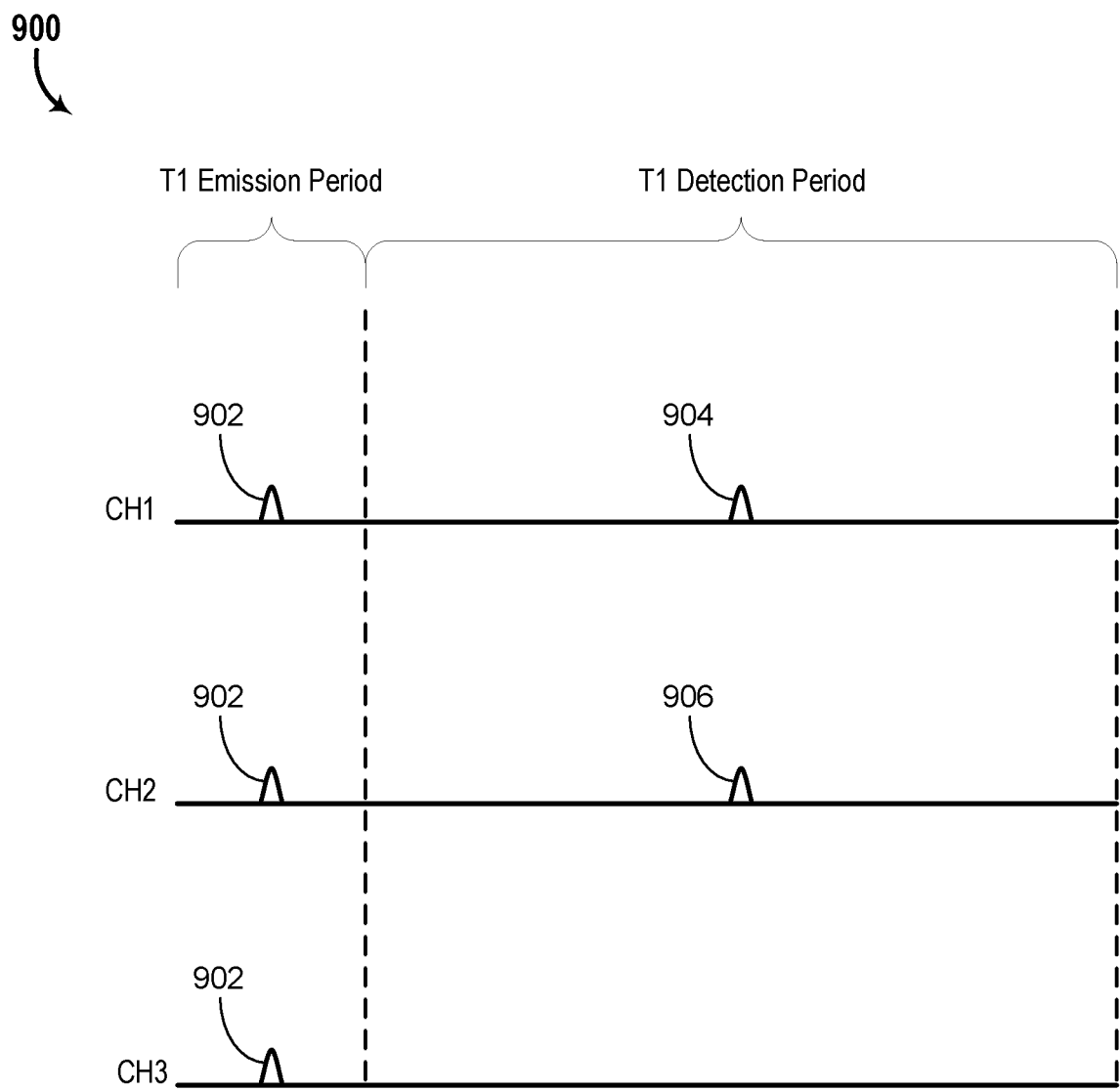
FIGS. 9A-9D are timing diagrams that illustrate a scenario in which a retroreflector is detected in the field of view of a primary light emitter of a LIDAR device, responsively deactivated, and subsequently reactivated when the retroreflector is no longer in the primary light emitter's field of view, according to an example embodiment.

FIG. 9A illustrates a measurement period T1 that is a specialized measurement period that is used to detect whether a retroreflector is within the field of view of any of the channels (CH1, CH2, and CH3). The secondary light emitter emits a secondary light pulse 902 into a wide field of view that encompasses the fields of view of CH1, CH2, and CH3. The intensity of the secondary light pulse 902 is sufficiently low such that a reflection of the secondary light pulse 902 would be detectable (e.g., detected above a threshold) only when reflected by a retroreflector. In this case, the detector in CH1 detects a reflected light pulse 904, the detector in CH2 detects a reflected light pulse 906, and the detector in CH3 does not detect a reflected light pulse. These detections indicate that a retroreflector is present in the fields of view of CH1 and CH2 but not in the field of view CH3. In response, the primary light emitters in CH1 and CH2 are deactivated for one or more subsequent measurement periods.

Figure 9B:
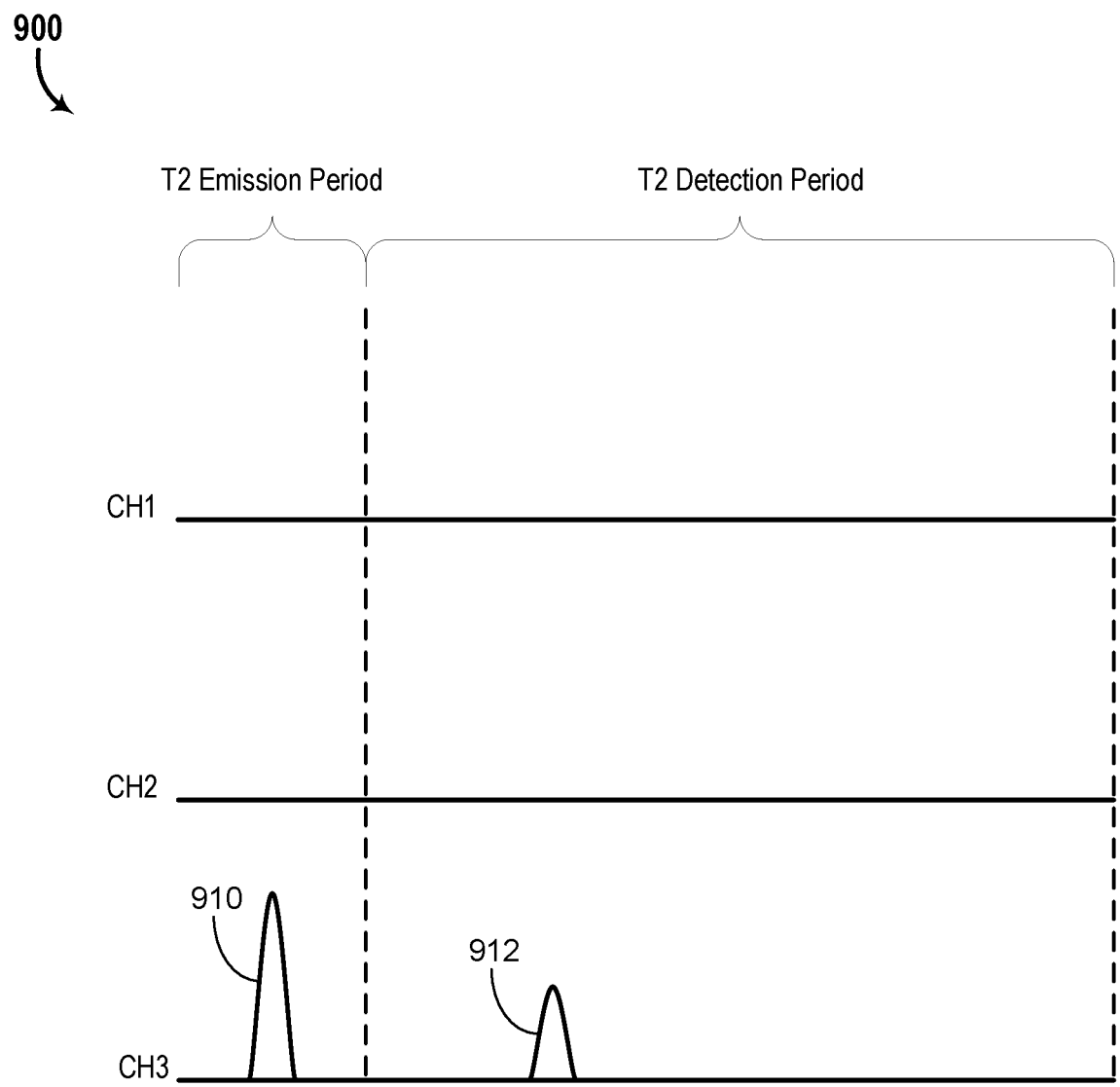

FIG. 9B illustrates a subsequent measurement period T2 that is a standard measurement period. The primary light emitter in CH3 emits a primary light pulse 910, and the detector in CH3 detects a reflected light pulse 912. The reflected light pulse 912 may be used to determine the distance to an object. The primary light emitters in CH1 and CH2 are deactivated, and the detectors in CH1 and CH2 do not detect any reflected light pulse.

Figure 9C:
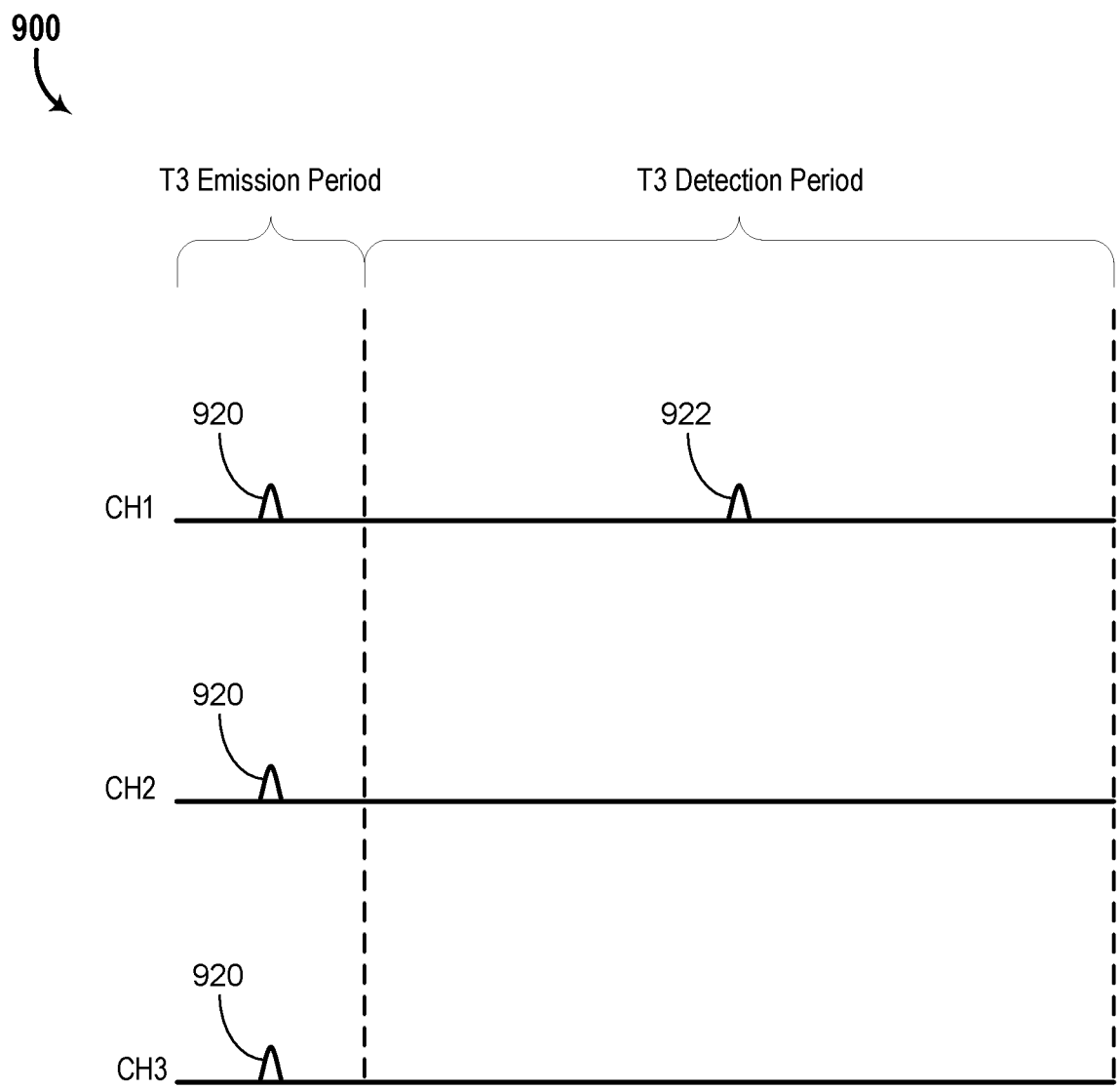

A subsequent specialized measurement period may be used to determine whether to reactivate the primary light emitter in CH1 and/or the primary light emitter in CH2. FIG. 9C illustrates a subsequent specialized measurement period T3. As shown, the secondary light emitter emits a secondary light pulse 920 into a wide field of view that encompasses CH1, CH2, and CH3. The intensity of the secondary light pulse 920 is sufficiently low such that a reflection of the secondary light pulse 920 would be detectable (e.g., detected above a threshold) only when reflected by a retroreflector. In this case, the detector in CH1 detects a reflected light pulse 922, but the detectors in CH2 and CH3 do not detect any reflected light pulses. These detections indicate that a retroreflector is still present in the field of view of CH1, that a retroreflector is no longer in the field of view CH2, and that a retroreflector is not in the field of view of CH3. In response, the primary light emitter in CH1 is deactivated for one or more subsequent measurement periods and the primary light emitter in CH2 is reactivated for one or more subsequent measurement periods.

Figure 9D:
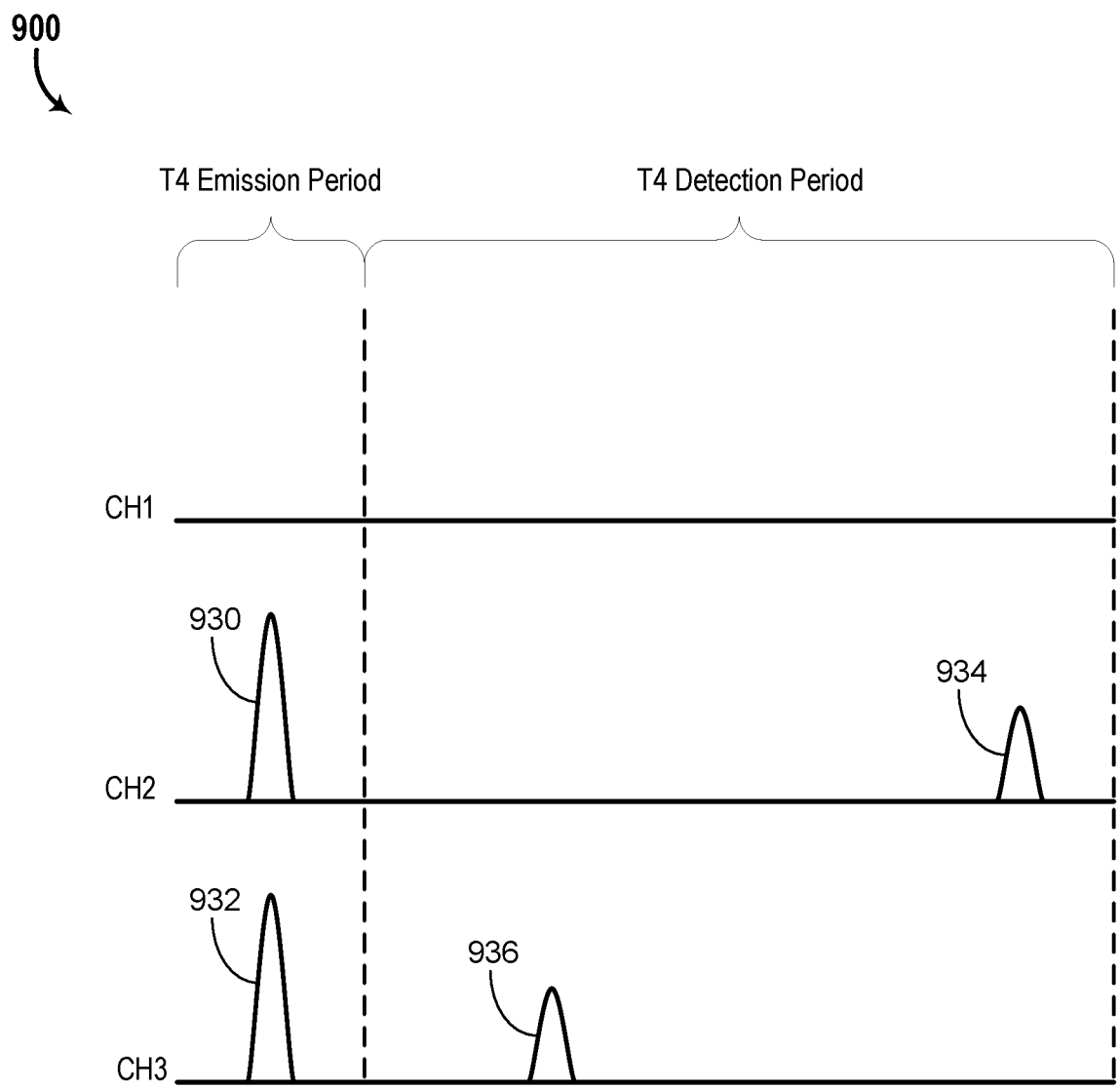

FIG. 9D illustrates a subsequent standard measurement period T4. As shown, the primary light emitter in CH2 emits a primary light pulse 930 and the primary light emitter in CH3 emits a primary light pulse 932. The primary light emitter in CH1 is deactivated, and the detector in CH1 does not detect a reflected light pulse. The detectors in CH2 and CH3 detect reflected light pulses 934 and 936, respectively, which may be used for determining distances to objects.

IV. EXAMPLE INFORMATION SHARING AMONG LIDAR DEVICES

As discussed above, a LIDAR device may detect that a retroreflector (or other highly reflective object) is within a field of view of a particular light emitter of the LIDAR device during a particular measurement period and may responsively deactivate the particular light emitter. In some implementations, the LIDAR device may also be configured to share information regarding the detected retroreflector with one or more other systems (e.g., one or more other LIDAR devices). This information sharing can be particularly beneficial when multiple LIDAR devices with overlapping fields of view are coupled to a vehicle, such as illustrated in FIGS. 4A-4E. For example, when a first LIDAR device on a vehicle detects a retroreflector that is also within the field of view of a second LIDAR device on the vehicle, information regarding the detected retroreflector may be shared with the second LIDAR device so that the second LIDAR device can deactivate a light emitter or take other action to avoid illuminating the retroreflector. The information sharing may occur via a computing device on the vehicle (e.g., a computing device that controls the vehicle in an autonomous or semi-autonomous mode of operation).

Figure 10:
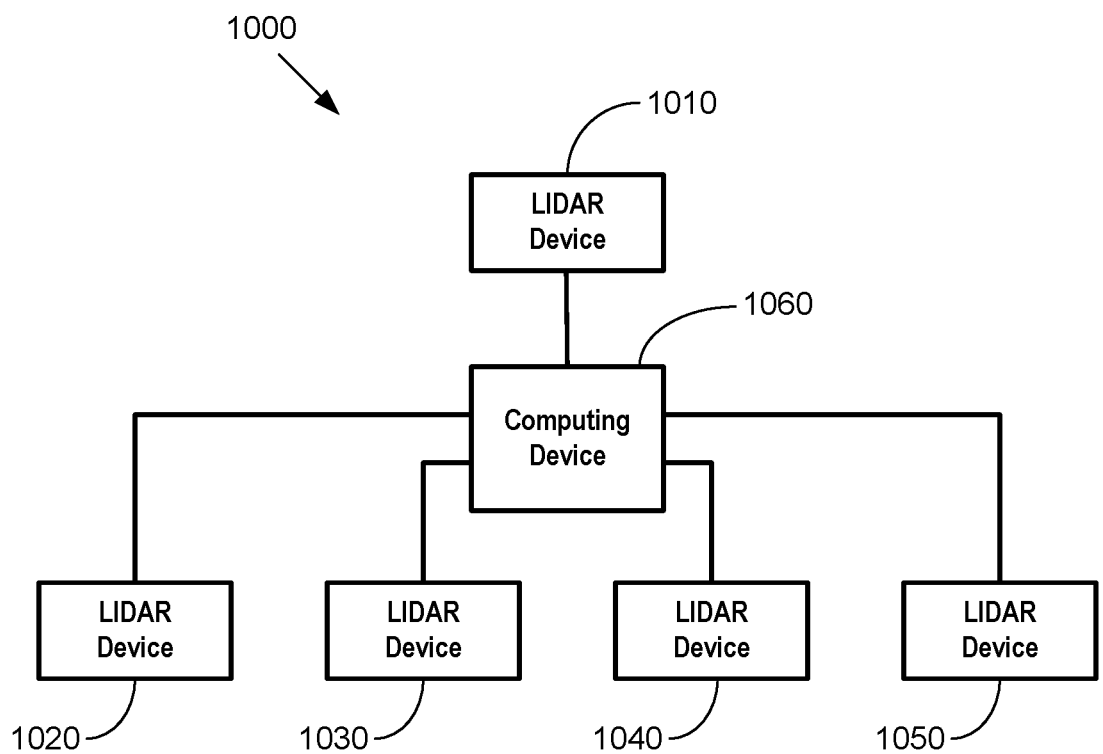
FIG. 10 is a block diagram of a system that supports information sharing among LIDAR devices, according to an example embodiment.

FIG. 10 illustrates an example system 1000 for sharing information (e.g., information regarding detected retroreflectors) among LIDAR devices coupled to a vehicle. In this example, system 1000 includes LIDAR devices 1010, 1020, 1030, 1040, and 1050 and also includes a computing device that is communicatively coupled to each of LIDAR devices. The LIDAR devices 1010-1050 could be coupled to a vehicle, for example, as shown in FIGS. 4A-4E. Thus, LIDAR device 1010 could be coupled to a roof of the vehicle (e.g., like sensor system 402), and LIDAR devices 1020-1050 could be coupled to front, rear, right, and left sides of the vehicle (e.g., like sensor systems 404-410). Computing device 1060 could also be coupled to the vehicle. For example, computing device 1060 may be configured to control the vehicle in an autonomous mode, such as controlling the speed, acceleration, direction, or other driving behavior of the vehicle.

System 1000 may be configured to support either one-way or two-way information sharing regarding retroreflectors. For one-way information sharing, one of the LIDAR devices (e.g., LIDAR device 1010) may be a "source" LIDAR device that is configured to detect retroreflectors and transmit information regarding detected retroreflectors to the computing device 1060, whereas the other LIDAR devices (e.g., LIDAR devices 1020-1050) may be "recipient" LIDAR devices that are configured to receive information regarding detected retroreflectors from the computing device 1060. For example, the source LIDAR device 1010 may detect a retroreflector (e.g., using any of the techniques described herein) and may responsively transmit information indicative of the location of the detected retroreflector to the computing device 1060. Based on this information, the computing device 1060 may identify one or more of the recipient LIDAR devices 1020-1050 as having a field of view that includes the detected retroreflector and may send a message regarding the detected retroreflector to each of the one or more recipient LIDAR devices. In response to receiving the message, each of the one or more recipient LIDAR devices may deactivate a light emitter or take other action to avoid illuminating the detected retroreflector.

Such one-way information sharing can be especially useful when the source LIDAR device has a wide field of view (e.g., 360 degrees around of the vehicle) and the recipient LIDAR devices each have a narrower field of view that at least partially overlaps the field of view of the source LIDAR device. The source LIDAR device could be configured to detect objects generally, or the source LIDAR device could be dedicated to detecting only retroreflectors.

In some implementations, system 1000 may support two-way information sharing regarding retroreflectors. In such implementations, retroreflectors may be detected by any of the LIDAR devices 1010-1050, and the computing device 1060 may transmit information regarding a detected retroreflector to any other LIDAR device that has the detected retroreflector in its field of view.

Figure 11:
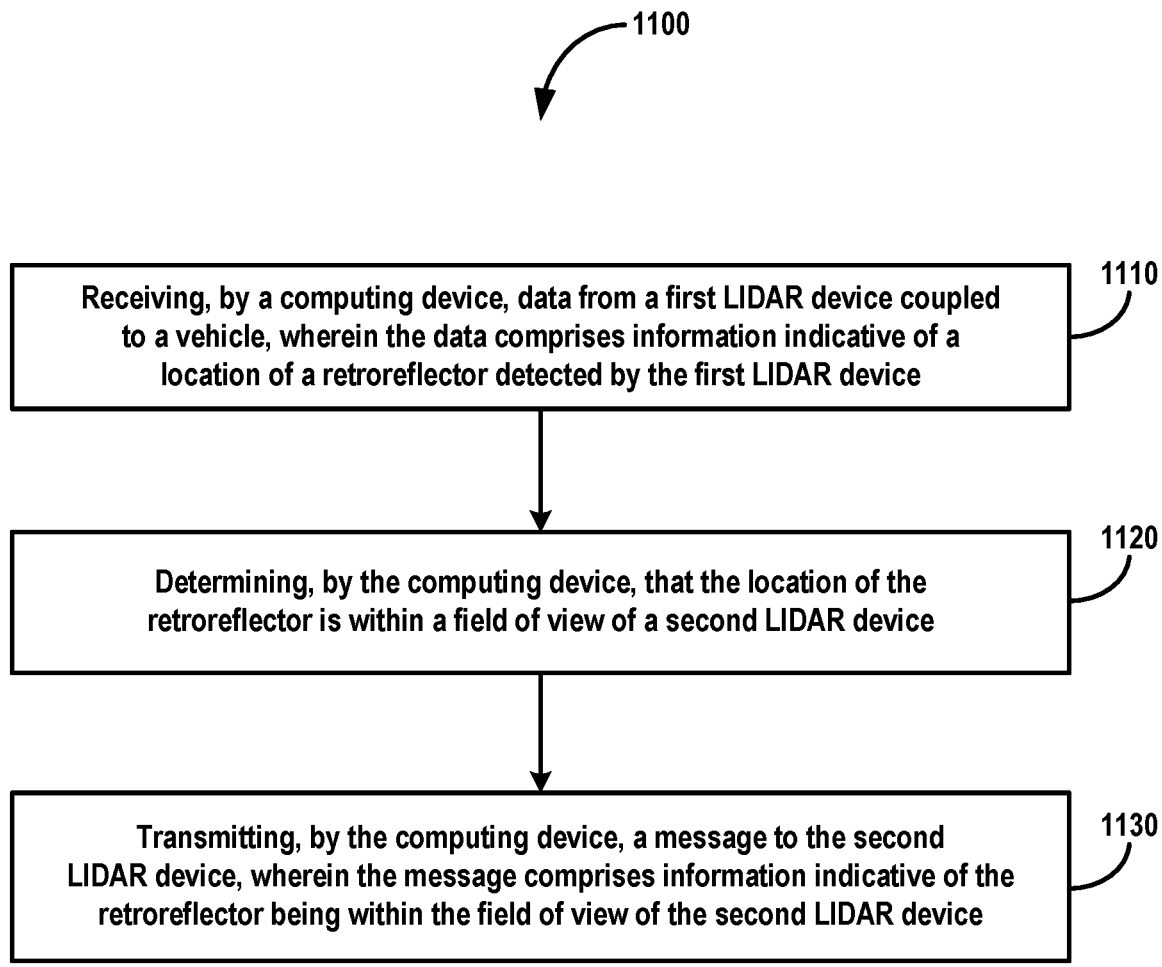
FIG. 11 is a flowchart of a method, according to an example embodiment.

FIG. 11 is a flowchart illustrating an example method 1100 for sharing information regarding detected retroreflectors. For purposes of illustration, method 1100 will be described with reference to the system 1000 shown in FIG. 10. It is to be understood, however, that other configurations could be used.

Method 1100 involves receiving, by a computing device (e.g., computing device 1060), data from a first LIDAR device (e.g., LIDAR device 1010) coupled to a vehicle, wherein the data comprises information indicative of a location of a retroreflector detected by the first LIDAR device, as indicated by block 1110. In some instances, the data could include information indicative of locations of multiple retroreflectors detected by the first LIDAR device. The data could also include other information.

The first LIDAR device may detect the retroreflector using any of the techniques described herein. The information indicative of the location of the detected retroreflector may include any information regarding the location of the retroreflector. For example, the information may indicate that the retroreflector was within the field of view of a particular light emitter of a plurality of light emitters in the first LIDAR device during a particular period of time (e.g., the particular measurement period in which the retroreflector was detected). Based on this information, the computing device can determine a direction in which the retroreflector is located. The information indicative of the location of the detected retroreflector may also indicate a distance to the retroreflector (e.g., based on a time difference between the time when the emitted light pulse was emitted and the time when the reflected light pulse from the retroreflector was detector). Other types of location information are possible as well.

Method 1100 further involves determining, by the computing device, that the location of the retroreflector is within a field of view of a second LIDAR device coupled to the vehicle, as indicated by block 1110. Method 1100 additionally involves transmitting, by the computing device, a message to the second LIDAR device, wherein the message comprises information indicative of the retroreflector being within the field of view of the second LIDAR device, as indicated by block 1120. In some instances, the message could include information indicative of multiple retroreflectors being within the field of view of the second LIDAR device (e.g., when the data from the first LIDAR device includes locations of multiple retroreflectors).

In one possible implementation, the computing device can map the location of the retroreflector to a location in a world frame of the vehicle. The field of view of each LIDAR device coupled to the vehicle can also be mapped to the world frame of the vehicle. The computing device can then identify any LIDAR device (other than the LIDAR device that detected the retroreflector) that has a field of view in the world frame that includes the location of the retroreflector in the world frame. In this way, the computing device can determine that the location of the retroreflector is within a field of view of a second LIDAR device coupled to the vehicle, and send a message regarding the retroreflector to the second LIDAR device. In some cases, the computing device may determine that the location of the retroreflector is within the fields of view of multiple LIDAR devices coupled to the vehicle. In such cases, the computing device may send a message regarding the retroreflector to each of the multiple LIDAR devices.

The information indicative of the retroreflector being within the field of view the second LIDAR device included in the message can be any information that enables the second LIDAR device to recognize that a retroreflector is within its field of view. In example embodiments, the second LIDAR device may responsively avoid illuminating the retroreflector. For example, in response to receiving the message, the second LIDAR may deactivate a light emitter in the second LIDAR device to avoid illuminating the retroreflector.

In some implementations, the information indicative of the retroreflector being within the field of view the second LIDAR device may specify a location of the retroreflector. For example, the information could include a relative location of the retroreflector relative to the second LIDAR device. The relative location could be mapped by the computing device from a location in the world frame of the vehicle to a location in a coordinate system or frame of reference of the second LIDAR device. The relative location of the retroreflector could be provided, for example, as a yaw angle of the second LIDAR device and a pitch angle of the second LIDAR device. However, other ways of specifying the location of the retroreflector are possible as well.

The information indicative of the retroreflector being within the field of view the second LIDAR device can also include other information regarding the retroreflector, such as whether the retroreflector is moving or static.

Method 1100 can also include steps to inform the second LIDAR device when the detector retroreflector is no longer present at the location. For example, when the first LIDAR device reactivates the light emitter that was previously deactivated in response to the detected retroreflector, the first LIDAR device can inform the computing device, and the computing device can send a second message to the second LIDAR device to indicate that there is no longer a retroreflector at the location previously indicated in the first message. The second message could, however, indicate that a retroreflector is still within the field of view of the second LIDAR device but at a different relative location. The change in the relative location could be the result of motion by the vehicle and/or motion by the retroreflective object.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method, comprising:
   emitting, by a light emitter of a light detection and ranging (LIDAR) device, a first light pulse into a field of view of the light emitter;
   determining that a detector of the LIDAR device detects, during a first measurement period, at least one reflected light pulse indicative of reflection by a retroreflector or other highly reflective object within the field of view of the light emitter;
   in response to detecting the at least one reflected light pulse indicative of reflection by a retroreflector or other highly reflective object within the field of view of the light emitter, deactivating the light emitter during one or more subsequent measurement periods, wherein the one or more subsequent measurement periods occur after the first measurement period; and
   determining when to reactivate the light emitter, wherein determining when to reactivate the light emitter comprises:
   determining whether the detector detects, during the one or more subsequent measurement periods, one or more additional reflected light pulses indicative of reflection by a retroreflector or other highly reflective object within the field of view of the light emitter.

2. The method of claim 1, wherein deactivating the light emitter during the one or more subsequent measurement periods comprises:
   controlling the light emitter such that the light emitter does not emit light during the one or more subsequent measurement periods.

3. The method of claim 1, wherein deactivating the light emitter during the one or more subsequent measurement periods comprises:
   controlling the light emitter such that the light emitter emits light at a reduced level during the one or more measurement periods.

4. The method of claim 1, further comprising:
   transmitting, from the LIDAR device to a computing device, information indicative of the retroreflector or other highly reflective object being within the field of view of the light emitter and detected during the first measurement period.

5. The method of claim 1, wherein determining when to reactivate the light emitter further comprises:
   making a determination that the detector detects, during a second measurement period, an additional reflected light pulse indicative of reflection by a retroreflector or other highly reflective object within the field of view of the light emitter, wherein the second measurement period occurs after the first measurement period; and
   in response to the determination, deactivating the light emitter during a third measurement period, wherein the third measurement period occurs after the second measurement period.

6. The method of claim 5, wherein the LIDAR device includes one or more additional light emitters, wherein the additional reflected light pulse indicative of reflection by a retroreflector or other highly reflective object within the field of view of the light emitter comprises stray light from the one or more additional light emitters that is reflected by the retroreflector or other highly reflective object within the field of view of the light emitter.

7. The method of claim 5, further comprising:
   emitting a secondary light pulse having a lower intensity than the first light pulse, wherein the additional reflected light pulse indicative of reflection by a retroreflector or other highly reflective object within the field of view of the light emitter comprises light from the secondary light pulse that is reflected by the retroreflector or other highly reflective object within the field of view of the light emitter.

8. The method of claim 1, wherein determining when to reactivate the light emitter further comprises:
making a determination that the detector does not detect, during a second measurement period, an additional reflected light pulse indicative of reflection by a retroreflector or other highly reflective object within the field of view of the light emitter, wherein the second measurement period occurs after the first measurement period; and
in response to the determination, reactivating the light emitter such that the light emitter emits, during a third measurement period, a second light pulse into the field of view of the light emitter, wherein the third measurement period occurs after the second measurement period.

9. The method of claim 1, wherein the light emitter emits the first light pulse during the first measurement period, wherein determining that the detector detects, during the first measurement period, at least one reflected light pulse indicative of reflection by a retroreflector or other highly reflective object within the field of view of the light emitter comprises:
detecting, by the detector, a reflected light pulse during the first measurement period; and
determining that the reflected light pulse is indicative of reflection by a retroreflector or other highly reflective object based on at least a shape of the reflected light pulse.

10. The method of claim 1, wherein the light emitter emits the first light pulse during a preceding measurement period, wherein the preceding measurement period occurs before the first measurement period, wherein the light emitter is a primary light emitter of the LIDAR device, wherein the LIDAR device includes a secondary light emitter, wherein the primary light emitter does not emit light during the first measurement period, further comprising emitting, by the secondary light emitter, a secondary light pulse during the first measurement period, wherein the secondary light pulse has a lower intensity than the first light pulse, wherein determining that the detector detects, during the first measurement period, at least one reflected light pulse indicative of reflection by a retroreflector or other highly reflective object within the field of view of the light emitter comprises:
detecting, by the detector, a reflected light pulse during the first measurement period; and
determining that the reflected light pulse is indicative of reflection by a retroreflector or other highly reflective object based on at least the reflected light pulse having a magnitude that exceeds a predetermined threshold.

11. The method of claim 1, wherein the light emitter is a primary light emitter of the LIDAR device, wherein the LIDAR device includes a secondary light emitter, and wherein the primary light emitter emits the first light pulse during the first measurement period, further comprising emitting, by the secondary light emitter, a secondary light pulse during the first measurement period, wherein the secondary light pulse has a lower intensity than the first light pulse, wherein the first light pulse and the secondary light pulse are separated in time by a predetermined time difference, wherein determining that the detector detects, during the first measurement period, at least one reflected light pulse indicative of reflection by a retroreflector or other highly reflective object within the field of view of the light emitter comprises:
detecting, by the detector, a first reflected light pulse at a first time during the first measurement period and a second reflected light pulse at a second time during the first measurement period; and
determining that the first and second reflected light pulses are indicative of reflection by a retroreflector or other highly reflective object within the field of view of the light emitter based on at least a time difference between the first time and the second time corresponding to the predetermined time difference.

12. A light detection and ranging (LIDAR) device, comprising:
a light emitter configured to emit light pulses into a field of view of the light emitter;
a detector configured to detect light from within the field of view of the light emitter; and
a controller configured to perform operations comprising:
controlling the light emitter to emit a first light pulse into the field of view of the light emitter;
determining that the detector detects, during a first measurement period, at least one reflected light pulse indicative of reflection by a retroreflector or other highly reflective object within the field of view of the light emitter;
in response to detecting the at least one reflected light pulse indicative of reflection by a retroreflector or other highly reflective object within the field of view of the light emitter, deactivating the light emitter during one or more subsequent measurement periods, wherein the one or more subsequent measurement periods occur after the first measurement period; and
determining when to reactivate the light emitter, wherein determining when to reactivate the light emitter comprises:
determining whether the detector detects, during a second measurement period, an additional light pulse indicative of reflection by a retroreflector or other highly reflective object within the field of view of the light emitter.

13. The LIDAR device of claim 12, wherein the operations further comprise:
in response to a determination that the detector does not detect, during the second measurement period, an additional light pulse indicative of reflection by a retroreflector or other highly reflective object within the field of view of the light emitter, reactivating the light emitter during the third measurement period, wherein the second measurement period occurs after the first measurement period and the third measurement period occurs after the second measurement period.

14. The LIDAR device of claim 12, wherein the LIDAR device comprises one or more additional light emitters, wherein the additional reflected light pulse indicative of reflection by a retroreflector or other highly reflective object within the field of view of the light emitter comprises stray light from the one or more additional light emitters that is reflected by the retroreflector or other highly reflective object within the field of view of the light emitter.

15. The LIDAR device of claim 12, wherein the operations further comprise:
in response to a determination that the detector detects, during the second measurement period, an additional light pulse indicative of reflection by a retroreflector or other highly reflective object within the field of view of the light emitter, deactivating the light emitter during a third measurement period.

16. A method, comprising:
- receiving, by a computing device, data from a first LIDAR device coupled to a vehicle, wherein the data comprises information indicative of a location of a retroreflector detected by the first LIDAR device;
- determining, by the computing device, that the location of the retroreflector is within a field of view of a second LIDAR device coupled to the vehicle; and
- transmitting, by the computing device, a message to the second LIDAR device, wherein the message comprises information indicative of the retroreflector being within the field of view of the second LIDAR device, wherein the information indicative of the retroreflector being within the field of view of the second LIDAR device comprises information indicative of a relative location of the retroreflector relative to the second LIDAR device.

17. The method of claim 16, wherein the first LIDAR device includes a plurality of light emitters, and wherein the information indicative of the location of the retroreflector detected by the first LIDAR device comprises information indicative of the retroreflector being within a field of view of a particular light emitter of the plurality of light emitters during a particular period of time.

18. The method of claim 17, further comprising:
- determining, by the computing device, a location of the retroreflector in a world frame of the vehicle based on the information indicative of the retroreflector being within the field of view of the particular light emitter of the plurality of light emitters during the particular period of time; and
- determining, by the computing device, the relative location of the retroreflector relative to the second LIDAR device based on the location of the retroreflector in the world frame of the vehicle.

19. The method of claim 16, wherein the information indicative of the relative location of the retroreflector relative to the second LIDAR device comprises a yaw angle of the second LIDAR device and a pitch angle of the second LIDAR device.

20. The method of claim 16, further comprising:
- in response to receiving the message by the second LIDAR device, deactivating at least one light emitter in the second LIDAR device.

\* \* \* \* \*